US011268486B2

(12) United States Patent
Freer et al.

(10) Patent No.: US 11,268,486 B2
(45) Date of Patent: Mar. 8, 2022

(54) IGNITER FOR GAS TURBINE ENGINE

(71) Applicant: PRATT & WHITNEY CANADA CORP., Longueuil (CA)

(72) Inventors: Richard Freer, Saint-Basile-le-Grand (CA); Kian Mccaldon, Orangeville (CA); Tin-Cheung John Hu, Markham (CA); Michel Bousquet, Longueuil (CA); André Fortin, Ste-Praxède (CA)

(73) Assignee: PRATT & WHITNEY CANADA CORP., Quebec (CA)

( * ) Notice: Subject to any disclaimer, the term of this patent is extended or adjusted under 35 U.S.C. 154(b) by 231 days.

(21) Appl. No.: 16/369,661

(22) Filed: Mar. 29, 2019

(65) Prior Publication Data

US 2020/0080529 A1    Mar. 12, 2020

Related U.S. Application Data

(60) Provisional application No. 62/730,064, filed on Sep. 12, 2018.

(51) Int. Cl.
*F02C 7/264*    (2006.01)
*F02C 7/266*    (2006.01)
(Continued)

(52) U.S. Cl.
CPC .............. *F02P 19/02* (2013.01); *F02C 7/264* (2013.01); *F02C 7/266* (2013.01); *F23D 11/446* (2013.01);
(Continued)

(58) Field of Classification Search
CPC .. F02C 7/26; F02C 7/262; F02C 7/264; F02C 7/266; F02P 19/00; F02P 19/02;
(Continued)

(56) References Cited

U.S. PATENT DOCUMENTS 3,017,541 A * 1/1962 Lawser .................. F23Q 7/001
219/267
3,297,914 A    1/1967 Saintsbury
(Continued)

FOREIGN PATENT DOCUMENTS

FR    2898960    9/2007
JP    3658770    6/2005
(Continued)

OTHER PUBLICATIONS

Champion Aerospace LLC Aviation Catalog AC-114, accessed Jan. 30, 2021 at https://www.championaerospace.com/pdfs/AV-14.pdf).

*Primary Examiner* — Scott J Walthour
(74) *Attorney, Agent, or Firm* — Norton Rose Fulbright Canada LLP

(57) ABSTRACT

There is disclosed an igniter for a gas turbine engine including: a base, a glow plug heater rod, the glow plug heater rod extending from the base along an axis and terminating in a rod end, a sleeve extending circumferentially around the glow plug heater rod along at least a portion of a length of the glow plug heater rod, the sleeve having an inner surface spaced from the glow plug heater rod to provide a gap between the inner surface and the glow plug heater rod, the gap extending radially relative to said axis.

20 Claims, 16 Drawing Sheets

(51) Int. Cl.
- *F02P 19/02* (2006.01)
- *F23R 3/30* (2006.01)
- *F23D 11/44* (2006.01)
- *F23R 3/34* (2006.01)
- *F23Q 7/00* (2006.01)

(52) U.S. Cl.
 CPC ............... *F23Q 7/001* (2013.01); *F23R 3/30* (2013.01); *F23R 3/343* (2013.01)

(58) Field of Classification Search
 CPC ............... F02P 19/028; F05D 2240/36; F05D 2260/99; F05D 2300/514; F05D 2300/612; F23N 2227/02; F23N 2227/42; F23Q 7/001; F23Q 7/06; F23Q 7/08; F23R 3/30; F23R 3/42
 See application file for complete search history.

(56) References Cited

U.S. PATENT DOCUMENTS

| | | | |
|---|---|---|---|
| 3,403,511 A * | 10/1968 | Jaekel | F02C 7/264 60/39.826 |
| 3,407,794 A | 10/1968 | Minoru et al. | |
| 3,990,834 A * | 11/1976 | DuBell | F02C 7/18 431/264 |
| 4,368,617 A | 1/1983 | Fukuda | |
| 4,418,661 A | 12/1983 | Esper | |
| 4,459,948 A | 7/1984 | Bauer | |
| 4,762,101 A | 8/1988 | Manolis | |
| 4,825,658 A | 5/1989 | Beebe | |
| 4,938,019 A * | 7/1990 | Angell | F02P 21/04 60/39.827 |
| 5,593,607 A | 1/1997 | Dam et al. | |
| 5,636,511 A | 6/1997 | Pfefferle et al. | |
| 5,676,100 A | 10/1997 | Dam et al. | |
| 5,998,765 A * | 12/1999 | Mizuno | F23Q 7/001 219/270 |
| 5,998,795 A | 12/1999 | Mizuno et al. | |
| 6,187,066 B1 | 2/2001 | Benz | |
| 7,470,875 B1 | 12/2008 | Wilcox et al. | |
| 9,897,319 B2 * | 2/2018 | Sonntag | F23R 3/002 |
| 9,927,125 B2 | 3/2018 | Carrere | |
| 10,865,761 B2 * | 12/2020 | Freer | F23R 3/30 |
| 2002/0036192 A1 * | 3/2002 | Sato | F02P 19/028 219/270 |
| 2002/0127506 A1 * | 9/2002 | Eberspach | F23Q 7/22 431/262 |
| 2002/0170293 A1 | 11/2002 | Farmer et al. | |
| 2005/0279862 A1 | 12/2005 | Mao et al. | |
| 2006/0096574 A1 | 5/2006 | Tourteaux et al. | |
| 2010/0242432 A1 | 9/2010 | Sullivan | |
| 2013/0195546 A1 | 8/2013 | Ponziani | |
| 2014/0366551 A1 | 12/2014 | Prociw et al. | |
| 2015/0260406 A1 * | 9/2015 | Carrere | F23D 11/446 60/787 |
| 2017/0176004 A1 * | 6/2017 | Maccaul | F23R 3/002 |
| 2019/0205499 A1 | 7/2019 | De Lange et al. | |
| 2020/0080482 A1 * | 3/2020 | Freer | F23Q 7/06 |
| 2020/0080486 A1 * | 3/2020 | Freer | F02C 7/266 |
| 2020/0080488 A1 * | 3/2020 | Freer | F02C 7/266 |
| 2020/0080490 A1 * | 3/2020 | Freer | F02C 7/266 |
| 2020/0080491 A1 * | 3/2020 | Freer | F02C 7/266 |
| 2020/0080492 A1 * | 3/2020 | Freer | F23R 3/002 |

FOREIGN PATENT DOCUMENTS

| | | |
|---|---|---|
| WO | 0126195 | 4/2001 |
| WO | 2009136389 | 11/2009 |

* cited by examiner

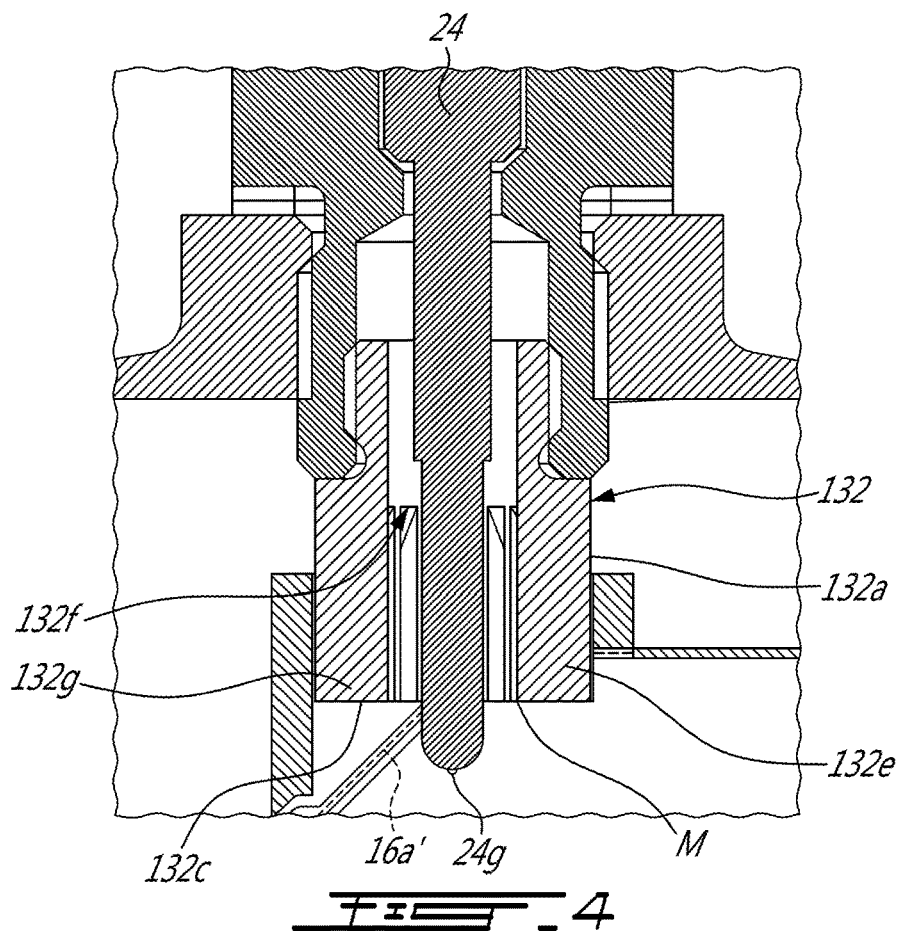
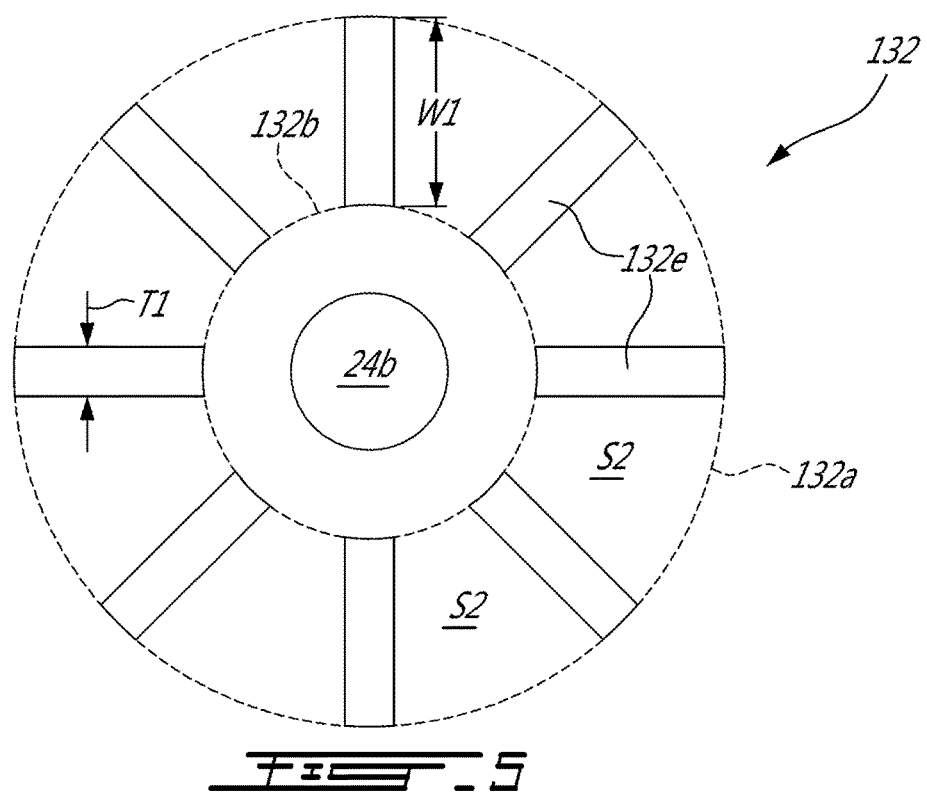

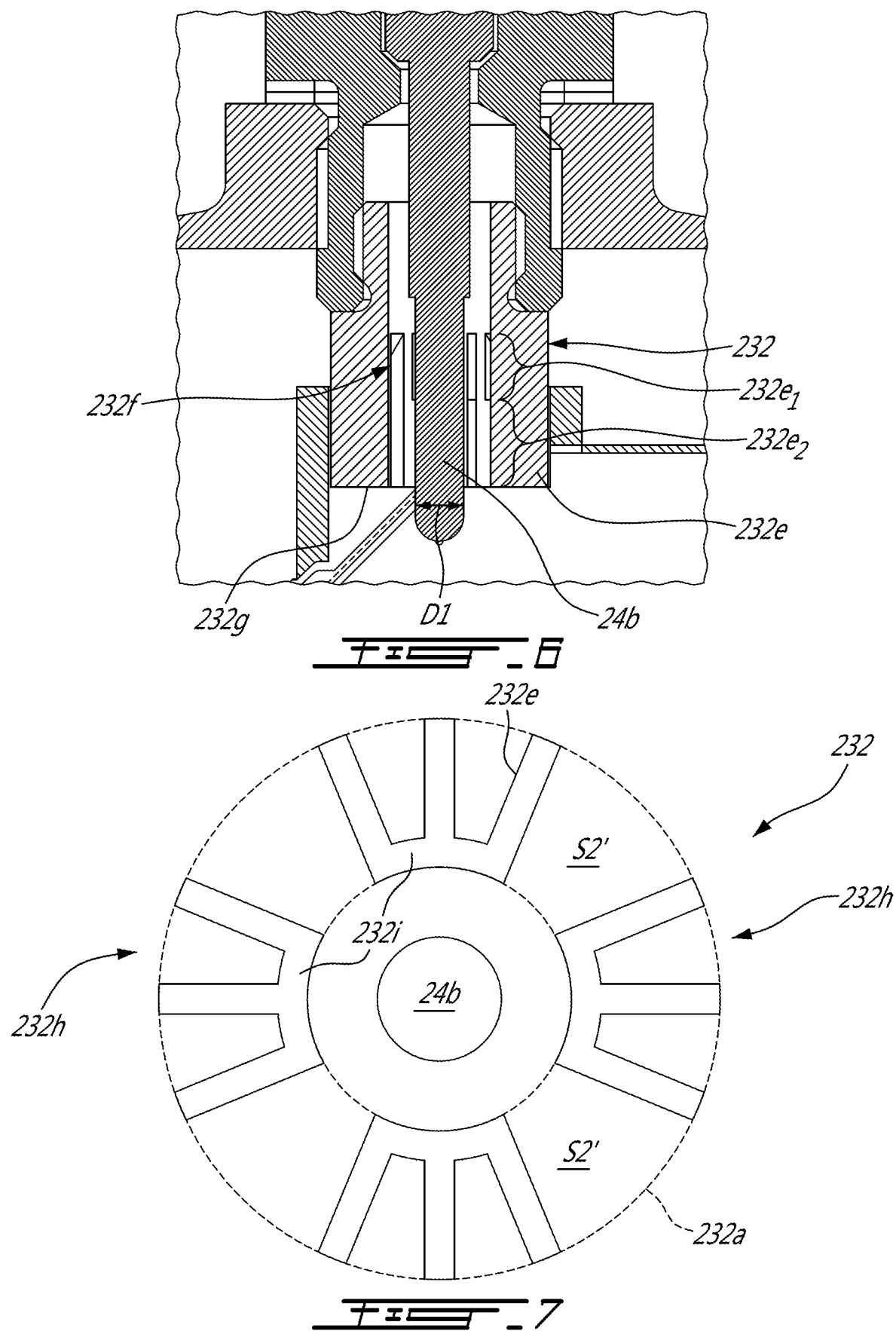

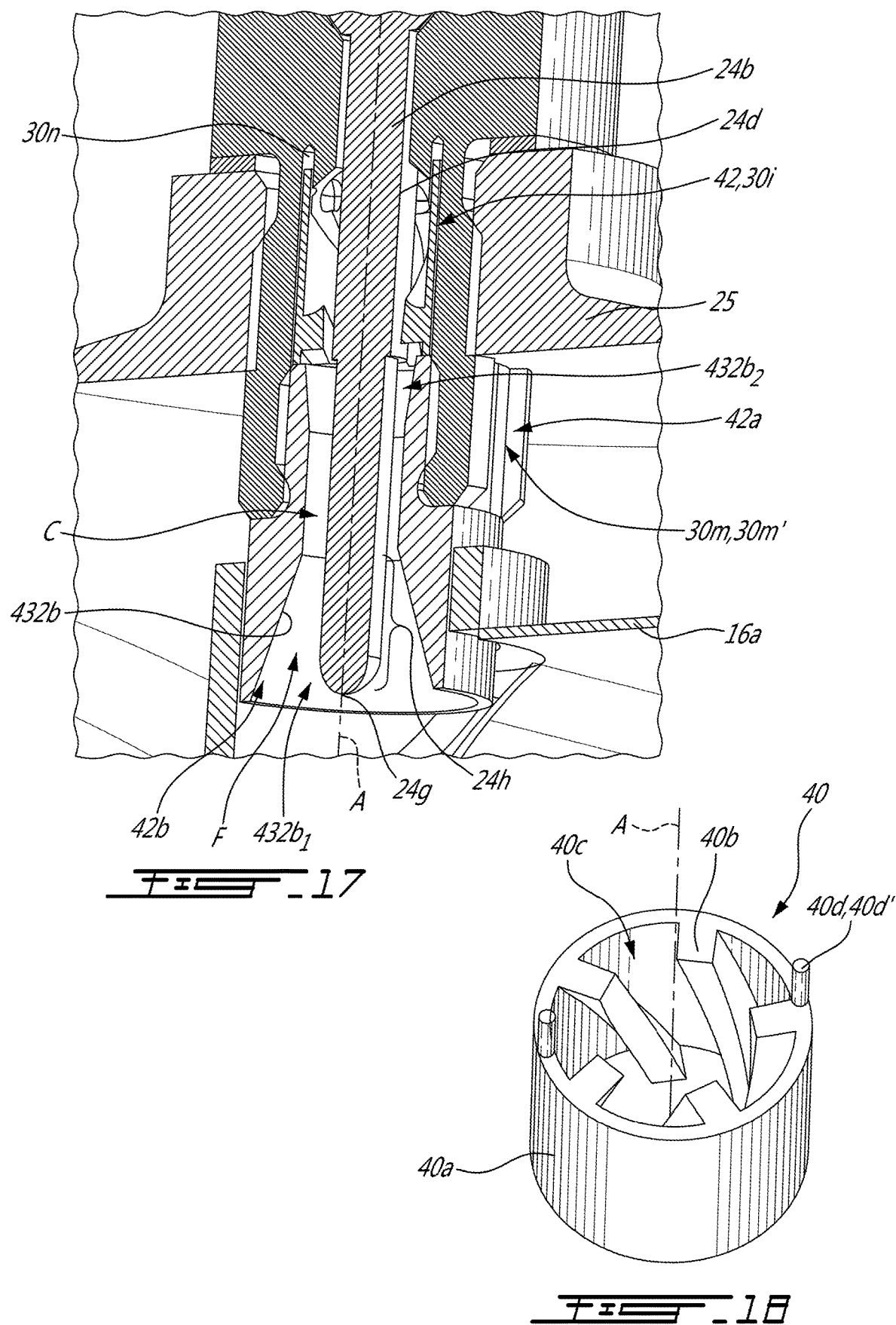

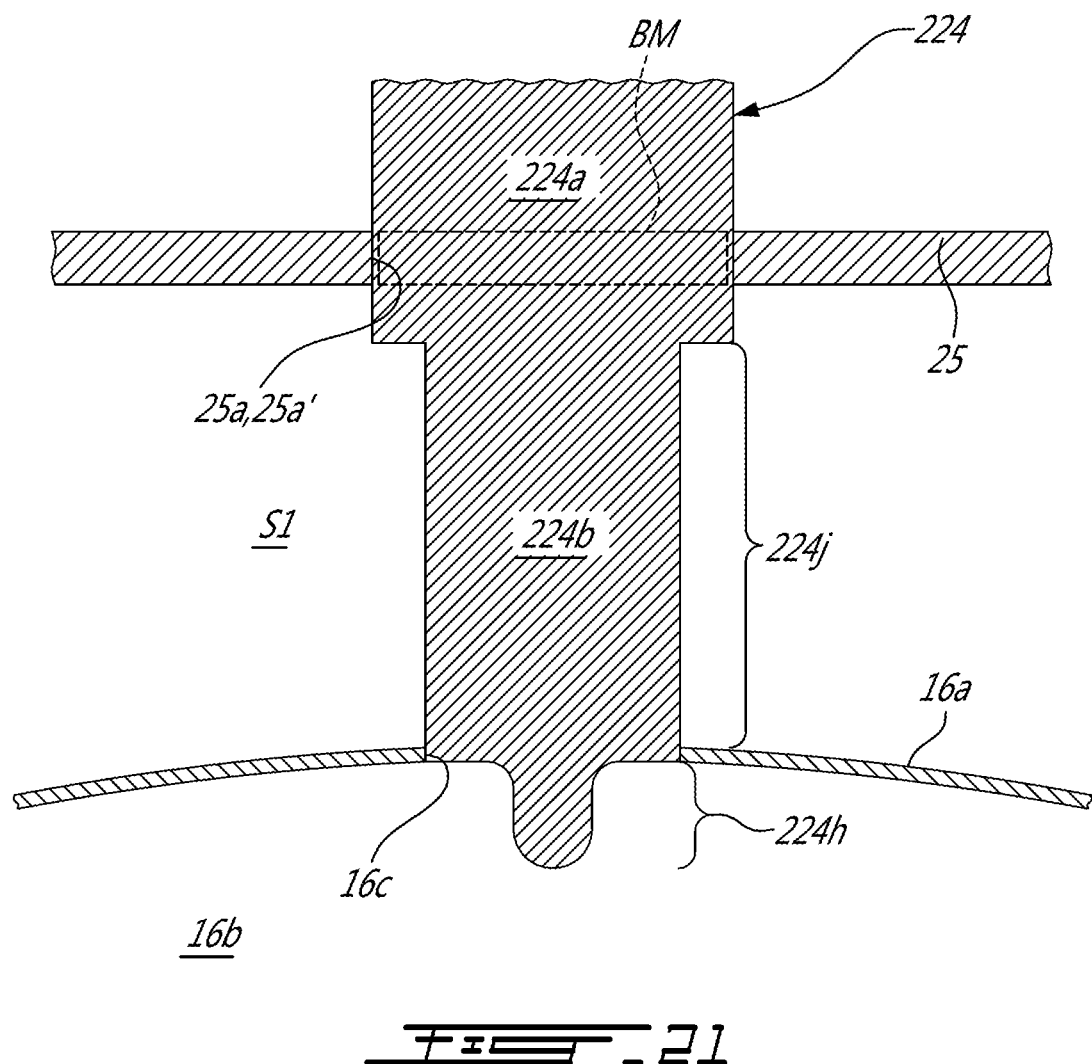

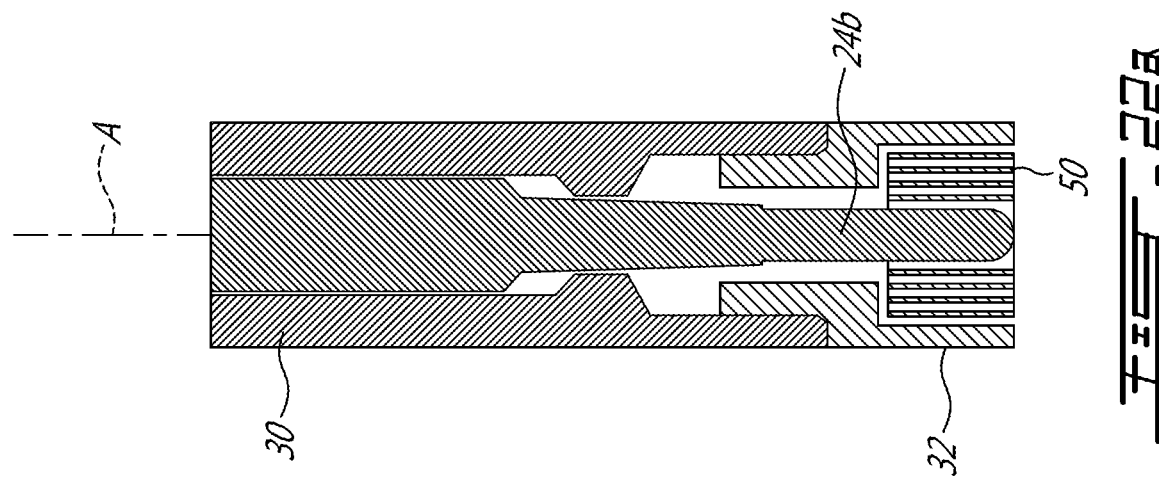
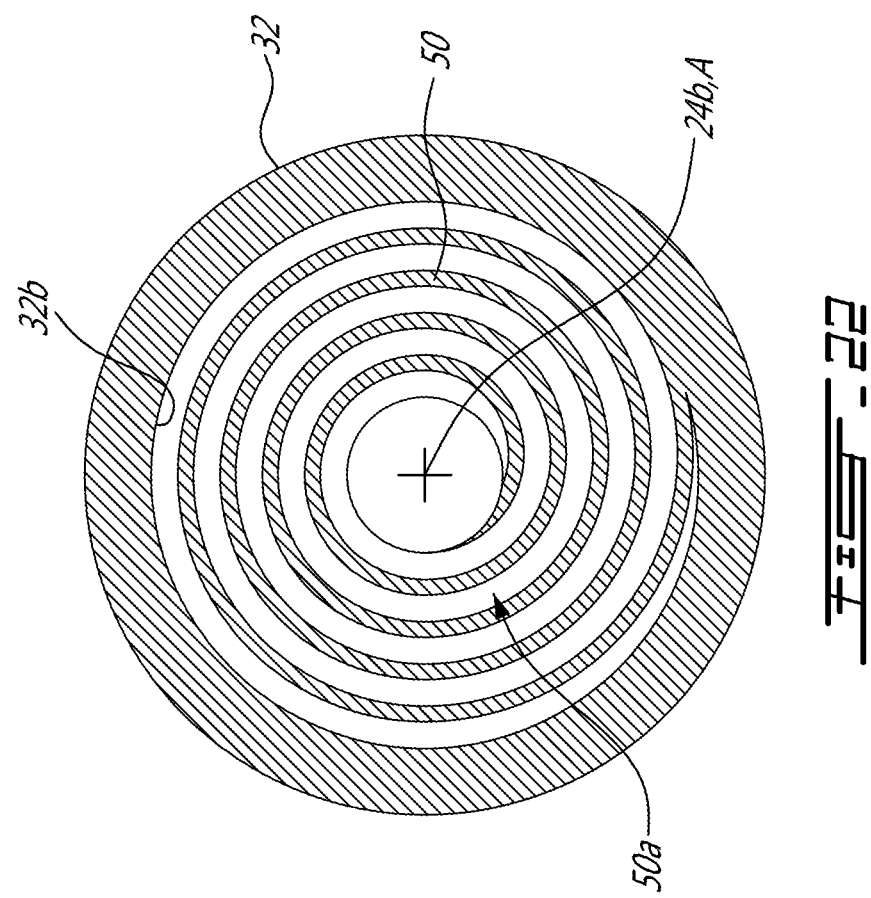

US 11,268,486 B2

IGNITER FOR GAS TURBINE ENGINE

TECHNICAL FIELD

The application relates generally to gas turbine engines and, more particularly, to igniters used for gas turbine engines.

BACKGROUND OF THE ART

Spark plugs are commonly used to ignite a mixture of air and fuel in a combustor of gas turbine engines. However, spark plugs for example have drawbacks. For instance, the spark plugs have been known to achieve less than full reliability in conditions such as when wet by exposure to condensation or washing fluid, or when the fuel and the engine are very cold. Cost is also a factor. There is always room for improvement.

SUMMARY

In one aspect, there is provided an igniter for a gas turbine engine comprising: a base, a glow plug heater rod, the glow plug heater rod extending from the base along an axis and terminating in a rod end, a sleeve extending circumferentially around the glow plug heater rod along at least a portion of a length of the glow plug heater rod, the sleeve having an inner surface spaced from the glow plug heater rod to provide a gap between the inner surface and the glow plug heater rod, the gap extending radially relative to said axis.

In another aspect, there is provided a method of operating an igniter of a gas turbine engine, comprising: receiving a mixture of air and fuel to be ignited in a flow circulation area around a heating section of a glow plug heater rod; igniting the mixture of the air and the fuel with the heating section of the heater rod; and impeding fluid circulation of the ignited mixture of the air and the fuel from flowing towards the base, between a sleeve and the heater rod.

In yet another aspect, there is provided a gas turbine engine comprising: a casing; a combustor liner within the casing and spaced apart therefrom, the combustor liner delimiting a combustion chamber; and an igniter, the igniter having a base connected to the casing and a glow plug heater rod, the glow plug heater rod extending from the base along an axis and terminating in a rod end, a sleeve extending circumferentially around the glow plug heater rod along at least a portion of a length of the glow plug heater rod, the sleeve having an inner surface spaced from the heater rod to provide a gap between the inner surface and the heater, the gap extending radially relative to said axis.

DESCRIPTION OF THE DRAWINGS

Reference is now made to the accompanying figures in which:

FIG. 4 is a cross-sectional view of an igniter in accordance with another embodiment;

FIG. 5 is a bottom view of the igniter of FIG. 4;

FIG. 6 is a cross-sectional view of an igniter in accordance with another embodiment;

FIG. 7 is a bottom view of the igniter of FIG. 6;

FIG. 17 is an oblique view of an igniter in accordance with another embodiment;

FIG. 18 is an oblique view of a swirler which can be used as part of the igniter of FIG. 17;

FIG. 21 is a schematic cross-sectional view of an igniter in accordance with another embodiment;

FIG. 22 is a schematic bottom view of an igniter in accordance with another embodiment;

FIG. 22a is a schematic cross-sectional view of the igniter of FIG. 22;

DETAILED DESCRIPTION

Figure 1:
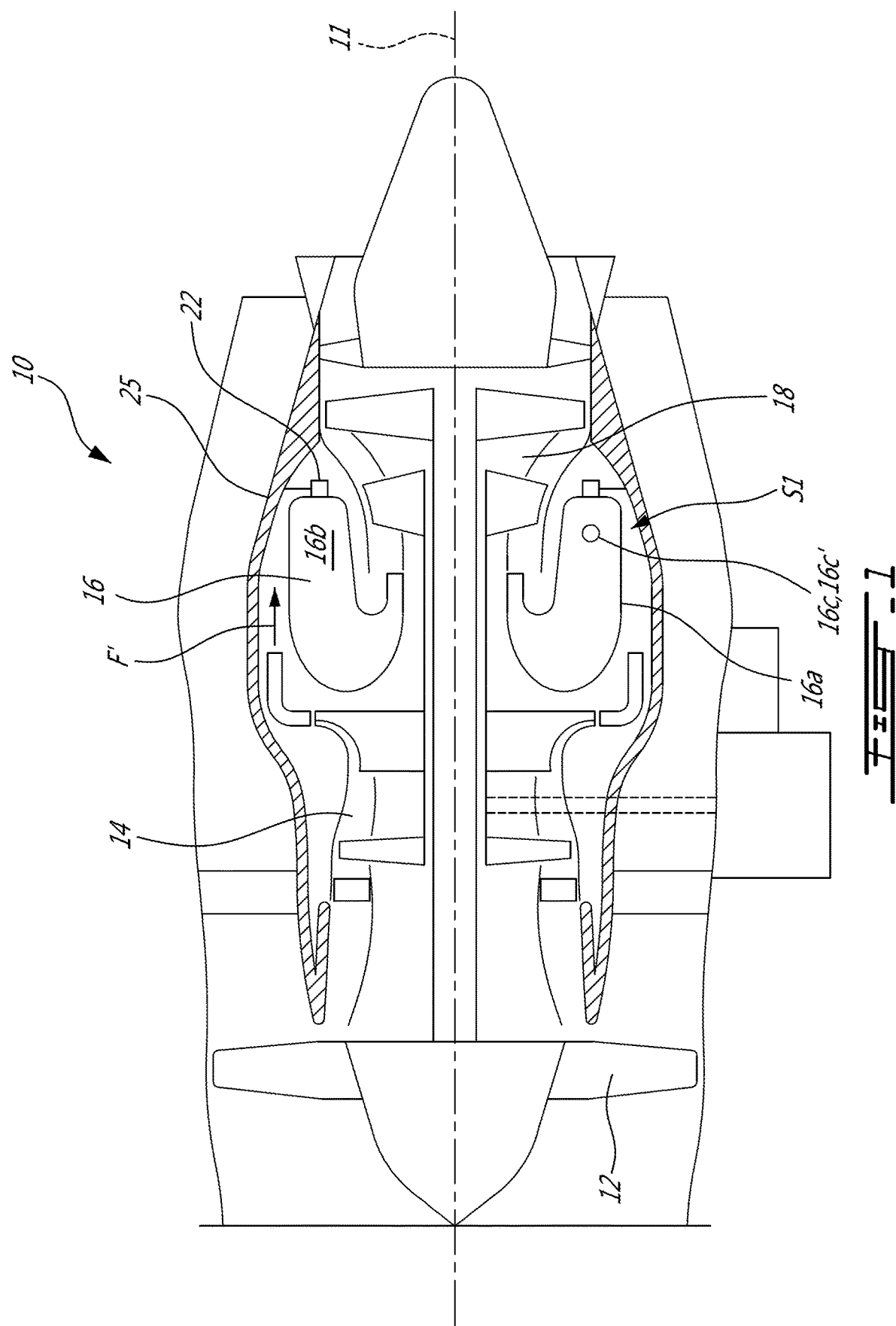
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The fan 12, the compressor section 14, and the turbine section 18 rotate about a central axis 11.

In this embodiment, the gas turbine engine includes an engine casing 25 that is disposed radially outwardly of the combustor 16 relative to the central axis 11. The combustor 16 has a combustor liner 16a that encloses a combustion chamber 16b. The combustor liner 16a can form part of the engine casing 25 and not rotate with the rotors. The combustor liner 16a defines at least one igniter liner aperture 16c for receiving at least one igniter 20 (FIG. 2), which is used for igniting a mixture of compressed air from the compressor section 14 and fuel injected by fuel injectors 22.

The engine casing 25 can also have one or more igniter apertures 25a, configured to receive the igniter 20 therein. As shown in greater detail in the example presented in FIG. 3, the igniter aperture 25a can be aligned with the igniter liner aperture 16c of the combustor liner 16a. In one embodiment, an axis of the igniter aperture 25a is coincident with an axis of the igniter liner aperture 16c. The igniter aperture 25a and the igniter liner aperture 16c can be said to form, collectively, an igniter socket. This alignment can allow an igniter to be received by both of the igniter liner aperture 16c and the igniter aperture 25a to reach the combustion chamber 16b of the combustor 16. In gas turbine engine 10, the igniter socket has a female thread designed to receive a mating male thread of a spark plug. Accordingly, a peripheral wall 25b of the igniter aperture 25a may include a threads 25c to be engaged by the igniter 20.

As will be described in greater detail below, a glow plug can be used to ignite fuel in a gas turbine engine and in some cases, such glow-plug-based igniters can have advantages over spark plugs. The following paragraphs present various embodiments of glow-plug-based igniters for use in a gas turbine engine setting, and a discussion about various elements which may have to be taken into consideration when retrofitting a glow-plug-based igniter into a spark plug aperture of a gas turbine engine.

More specifically some igniters having a heater in the form of an exposed coil shaped resistors have been referred to as "glow plugs" in the past. In newer glow plug designs, the heater is typically encapsulated in a protective shell and the resulting assembly is referred to as a heater rod. Spark plugs ignite a mixture of air and fuel by generating a spark whereas glow plugs ignite such a mixture of air and fuel by having a tip section heated at a temperature above the fuel ignition temperature. At such elevated temperatures, the tip section "glows", which led to the use of the familiar expression "glow plug". A typical heater rod can have a surface made of non-oxidizing material that can withstand temperatures above 1000 degrees Celsius, which can impede carbon formation.

In the embodiment illustrated, the gas turbine engine 10 was initially designed for using a specific model of spark plugs as the igniters. The igniter presented in FIG. 2 includes a heater rod, and was designed to be used instead of the spark plugs.

There can be dimensional issues to consider in using a heater rod-based igniter in a spark plug socket. Indeed, off-the-shelf glow plugs can be smaller in diameter than the spark plugs designed for the specific gas turbine engine 10. It can be desired to control the depth of the heating tip of the heater rod. Moreover, it may be desired to provide the igniter with some additional feature or features, which may not be integrated with the off the shelf glow plugs, to allow them to be better suited for the gas turbine engine environment.

One avenue is to design glow plugs specifically for the intended use and context, which can include providing a body having suitable features which an off-the shelf glow-plug does not have. Another alternative is to design an adapter to a) fit a spark plug aperture, b) receive an off-the shelf glow plug and c) provide any additional feature useful in adapting the off-the-shelf glow plug to the specific gas turbine engine environment. In several of the embodiments described and illustrated, the avenue of using an igniter consisting of an off-the-shelf glow plug+adapter was preferred over the avenue of providing a new glow plug design, mostly because it was easier to design an adapter for an existing glow plug design than to design and producing a specific, new glow plug design specifically adapted to the application. Nonetheless, specific glow plug designs used without adapters can be preferred in some embodiments, and will be discussed further below.

Figure 3:
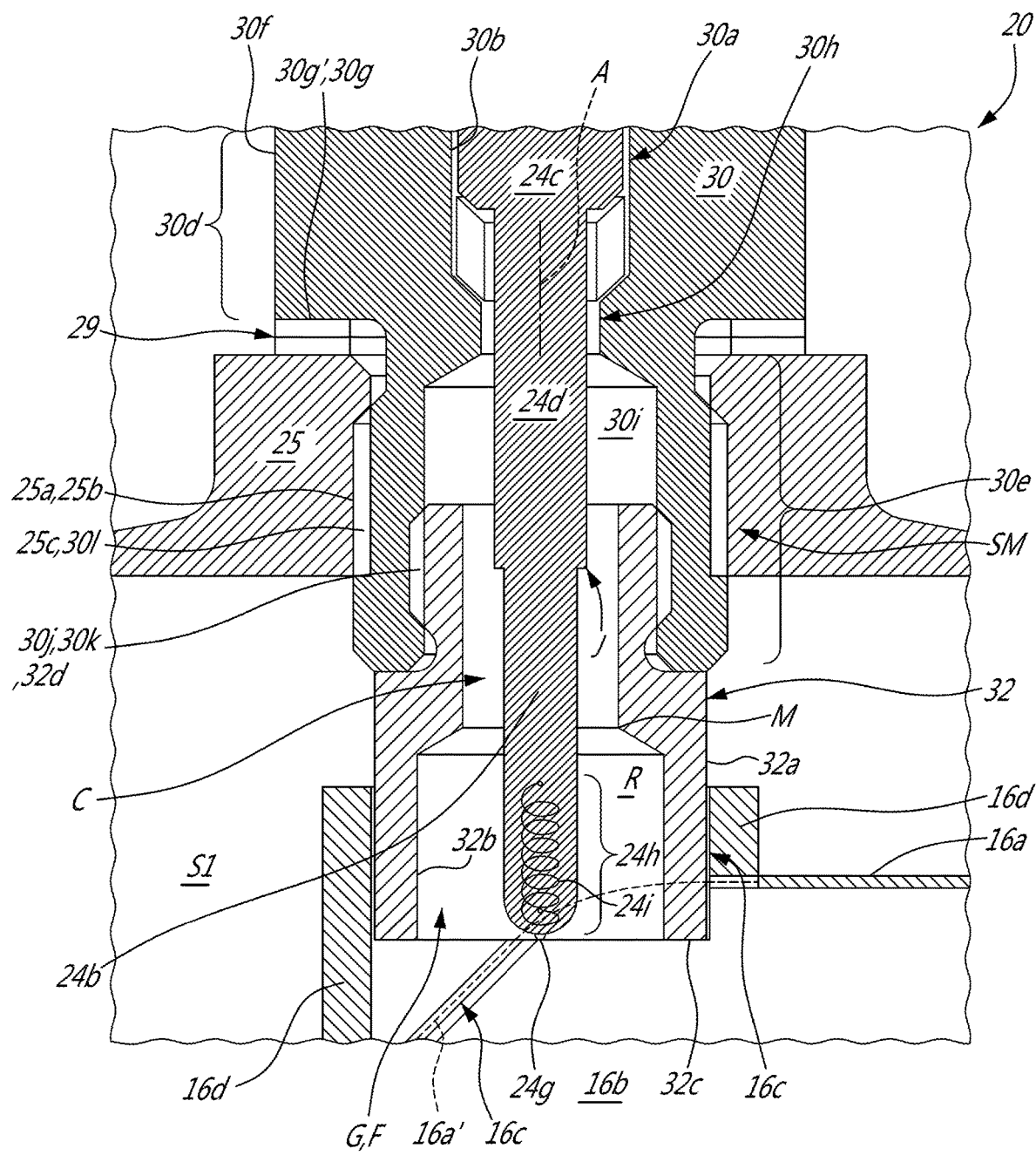
FIG. 3 is a cross-sectional view of the igniter of FIG. 2, taken along a longitudinally-oriented plane, shown in an environment of use.

In the embodiment shown in FIG. 3, the igniter liner aperture 16c and the igniter aperture 25a correspond to a spark plug socket PS configured for receiving therein a spark plug. A flow F' of compressed air exits the compressor section 14 and is fed in an annular spacing S1, also referred to as a compressed gas passage, defined radially between the combustor liner 16a and the engine casing 25 relative to the central axis 11. The combustor liner 16a can have a plurality of apertures (not shown) configured for allowing the flow F' of compressed air to enter the combustion chamber 16b to be mixed with fuel and ignited.

Figure 2:
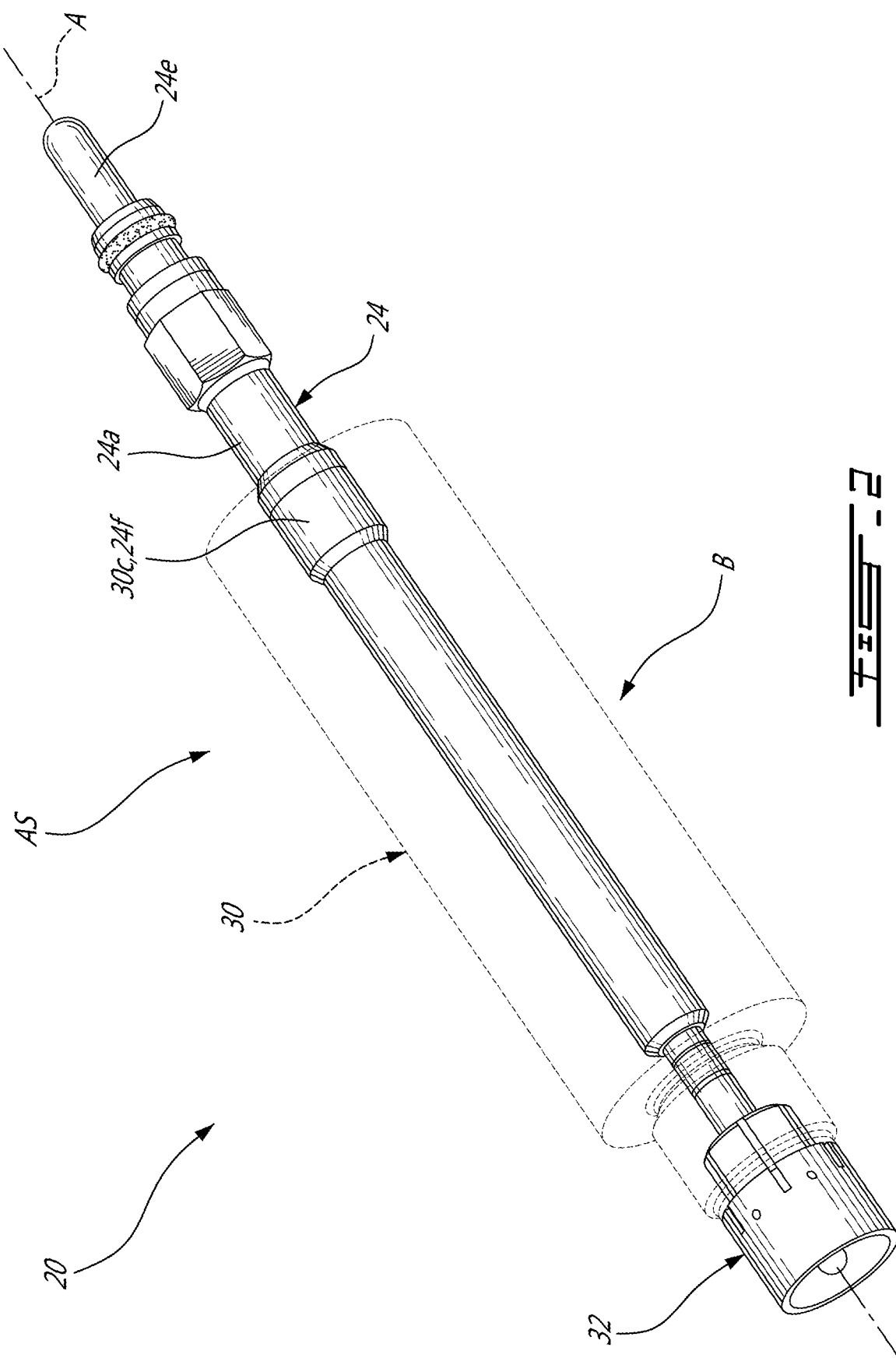
FIG. 2 is an oblique view of an igniter in accordance with one embodiment.

Referring to FIGS. 2-3, the igniter 20 includes a glow plug that is generally shown at 24. The disclosed glow plug 24 is of a "pencil-type", and has a heater rod having a protective shell encapsulating a heater. The heater can be a coiled resistive element. As shown, the glow plug 24 extends along an axis A and has a body 24a and a heater rod 24b protruding from the body 24a along the axis A. As shown, the heater rod 24b extends across the spacing S1. In the depicted embodiment, the heater rod 24b has a ceramic portion which includes the "heater portion" of the glow plug 24 that becomes hot and "glows" to ignite the mixture of air and fuel. Various types of heater rods exist, in some types of heater rods, the heater rod 24b of the glow plug 24 may be made of a metallic material, in some other types, the glow plug heater rod 24b may be covered by a metallic material, such as Inconel™. The glow plug body 24a includes a main section 24c and an intermediate section 24d. The intermediate section 24d is located axially between the main section 24c and the heater rod 24b relative to the axis A. A metal to ceramic junction J may be located at an intersection of the intermediate section 24d and the heater rod 24b. As shown, a diameter of the intermediate section 24d is less than that of the main section 24c and greater than a diameter of the heater rod 24b. The glow plug 24 includes connection means 24e, which can include a positive and a negative connection terminals, configured to be electrically connected to a power source. The body 24a of the glow plug 24 includes a threaded portion 24f for securing the glow plug 24 to a structural element of the gas turbine engine 10 that may be, for instance, the threads 25c of the peripheral wall 25b of the igniter aperture 25a of the engine casing 25.

The glow plug 24 has a heater located inside the heater rod 24b for heating the heater rod 24. In the embodiment shown, the heater is a heating coil 24i. Ceramic powder may be provided around the coil 24i to fill a gap between the coil 24i and an external shell of the heater rod 24b. The heater rod 24b has a tip section 24h that extends from an end 24g of the heater rod toward the body 24a of the glow plug 24. A length of the tip section 24h is less than that of the heater rod 24b. The tip section 24h is also referred to as a heating section of the glow plug 24 as it is that section that "glows" for igniting the mixture of air and fuel.

The heating section 24h is typically the portion of the heater rod 24b that reaches temperature above 400 degrees Celsius in operation. The heating section 24h may reach a temperature of about 1100 degrees Celsius along a length of about 2 mm extending from the end 24g of the heater rod 24b, and can be said to extend axially along a portion of the length of the heater rod, between the axial positions of the two opposite ends of the heater.

The combustor liner 16a has a collar 16d which surrounds a whole periphery/circumference of the igniter liner aperture 16c. The collar 16d and the combustor liner 16a may be monolithic, e.g. via machining from a single component, or otherwise integral to one another, e.g. via soldering. The collar 16d extends from the combustor liner 16a toward the engine casing 25 and within an annular spacing S defined therebetween. The collar 16d is configured for receiving a portion of the igniter 20

Still referring to FIGS. 2 and 3, in this embodiment, the igniter 20 includes an off-the-shelf glow plug 24 and a gas turbine engine adaptor 30, referred to hereinbelow simply as an adaptor 30. As discussed above, a primary feature of the adaptor 30 can be to allow to fit an off-the-shelf glow plug to the female threads which were designed for a spark plug. However, the adaptor can also have one or more features providing additional functionality.

Indeed, in FIGS. 2 and 3, for instance, the adaptor 30 is also used to fill a gap that might otherwise exist between the peripheral wall 25b of the igniter aperture 25a of the engine casing 25 and the glow plug 24. A sealing engagement may be created between the adaptor 30, more specifically its outer surface 30f where it is threaded, and the igniter aperture 25a that may be correspondingly threaded.

In this embodiment, the adaptor 30 is hollow and defines a cavity 30a or socket for receiving therein the glow plug 24. An inner surface 30b of the adaptor 30 may have a threaded portion 30c configured for being engaged by threads of the correspondingly threaded portion 24f of the body 24a of the glow plug 24. Other means of securing the adaptor 30 to the body 24a of the glow plug 24 may be used without departing from the scope of the present disclosure. In a particular embodiment, a glow plug may have a body that is tailored to the igniter aperture 25a of the engine casing 25 or combustor liner 16d and may not require the adaptor 30. Stated otherwise, the glow plug 24 and the adaptor 30 may be monolithic.

In the embodiment shown, the inner surface 30b of the adaptor 30 defines a constriction 30h that creates an abutment surface configured to be in contact with an end of the main section 24c of the body 24a of the glow plug 24. The abutment of the glow plug against the inner surface 30b of the adaptor and at the constriction 30h may limit movements relative to the adaptor 30 of the glow plug 24 along its axis A and toward the combustion chamber 16b.

In the embodiment shown, the adaptor 30 has a first section, also referred to as a casing portion, 30d and a second section 30e that are both annular and define portions of the adaptor conduit 30a for receiving the glow plug 24. The second section 30e includes a securing mechanism, or assembly, SM configured to be matingly connected to the casing 25 of the gas turbine engine 10. At an outer surface 30f of the adaptor 30, the first section 30d has a diameter greater than that of the second section 30e to create an abutment surface 30g that contacts an outer side of the engine casing 25. In other words, the abutment surface 30g is defined by a shoulder 30g' of the adaptor 30. The second section 30e extends axially relative to the axis A from the first section 30d toward an end of the adaptor 30 and is configured to be received within the igniter aperture 25a defined through the engine casing 25 and through the igniter liner aperture 16c of the combustor liner 16a. More specifically, the second section 30e of the adaptor 30 has a threaded section 30l that is configured to engage the threaded section 25c of the peripheral wall 25b of the igniter aperture 25a.

The portion of the igniter which is designed to be secured to the igniter aperture 25a can be referred to as the base, independently of whether the igniter is a specific, integral, glow plug design or of the "off-the-shelf glowplug"+adaptor type.

In the embodiment shown, rings also referred to as spacers 29 are located between the abutment surface 30g of the base and the engine casing 25 for adjusting a depth of penetration of the adaptor in the spacing S1. In other words, either a thickness of the rings 29 along the axis A and/or a number of the rings 29 may be varied to change the depth of penetration of the adaptor, and hence of the end 24g of the heater rod 24b within the combustion chamber. These spacers 29 were used for experimental purposes, allowing to easily test different depths of the igniter into the combustion chamber, and will likely be omitted from an industrial production of igniters (or adaptors), the industrial production being specifically designed to have an optimal distance between the shoulder engagement and the heater rod tip.

A challenge can arise in relation to the amount of fuel which will be exposed to the heating section of the heater rod, with the objective of reaching auto-ignition, and flame sustenance conditions.

Another challenge can stem from the body 24a of the glow plug 24, more specifically its inter mediate section 24d (which can be a metal shell portion leading to a ceramic shell portion for instance), being less tolerant to high temperatures than the tip, and may need to be kept to a temperature that is substantially below the tip temperature and below a temperature inside the combustion chamber 16b of the combustor 16.

Referring to FIG. 3, the igniter includes a sleeve 32. The sleeve 32 may be connected to the base B independently of a structure of the gas turbine engine and protruding along the axis A from the base B toward the rod end 24g. The sleeve 32 is disposed around the glow plug 24. The sleeve member 32 has an outer surface 32a that faces away from the glow plug 24 and an inner surface 32b that faces the glow plug 24. In the embodiment shown, the sleeve 32 is connected to an adaptor 30. More specifically, the second section 30e of the adaptor 30 defines a mechanism 30j for holding the sleeve 32. In the depicted embodiment, the mechanism 30j includes a threaded section 30k of the adaptor 30. The sleeve outer surface 32a defines a threaded section 32d that is configured to cooperate with the threaded section 30k of the adaptor 30 to limit axial movements of the sleeve 32 with respect to the adaptor 30 relative to the axis A. This was provided for test purposes, to allow to easily test various sleeve designs, and in an industrial production, the sleeve can be integral to the base, for instance. In a particular embodiment, the sleeve 32 is axisymmetric around the axis A, and extends along a full circumference of the heater rod, but in alternate embodiments, the sleeve may extend only partially circumferentially around the heater rod or may intermittently extend circumferentially around the heater rod (e.g. be crenellated), for instance.

The sleeve can offer one or more of the following additional functionalities:

a) shielding the heater rod from the circulation of compressed gas between the combustion chamber liner and the gas turbine engine casing, b) forming a constriction in a gap between the sleeve and the heater rod to impede combustion heat from accessing the metal-to-ceramic joint J, c) fully or partially occupying a gap between which could otherwise be present between the combustion chamber liner and the igniter, and thereby impeding flow of compressed gas directly across the combustion liner aperture which could otherwise be detrimental to ignition or flame sustenance conditions, to name a few examples.

As discussed above, the structure which is used to provide such additional functionality to the heater rod can be structurally connected to the base of the igniter, i.e. the portion of the igniter which is secured to the engine casing. To this end, the structure can be a) i) integrated to an adaptor designed to receive an off-the-shelf glow plug, or ii) be included in the design of a new glow plug design specifically adapted to these conditions, in which case it can be integral to the glow plug body. However, it will be understood that alternately such structure can b) form part of an adaptor member, distinct from the glow plug itself, which is designed to be secured to the combustion chamber liner, for instance, or even c) secured to the heater rod, such as by soldering or any suitable alternate form of securing. It will be understood that other structures providing other possibilities of added functionalities are described below, and that such other structures can be integrated to the igniter in accordance with either one of the options a)i), a)ii), b) or c) above.

In the embodiment shown, the sleeve 32 provides the added functionality of defining a fuel receiver R that can have a surface designed to be wetted by fuel, in a manner to favor ignition of the by the heater rod 24b. As illustrated in FIG. 3, the sleeve also forms an annular spacing, or annular gap G that circumferentially extends a full circumference around the heater rod 24b. The annular spacing can be designed in a manner to provide a pocket area of gaseous fuel and air mixture around the hot tip of the glow plug where the gas velocity is limited, to favor ignition and flame sustenance conditions.

In a particular embodiment, the sleeve 32 may be configured to protect the heater rod 24b from the hot compressed air that circulates in the spacing S1 (FIG. 1) and may limit fluid communication from the combustion chamber 16b enclosed by the combustor liner 16c toward the base B of the igniter 20. In the embodiment shown, the sleeve 32 has a substantially cylindrical shape. It is understood that other shapes are contemplated. In a particular embodiment, the sleeve can form a constriction, axially upward from the annular spacing forming the pocket area, to protect the plug intermediate section 24d from excessive temperature due to elevated air temperatures in the spacing S1 immediately after engine shutdown when there is no airflow through the engine.

In a particular embodiment, the fuel receiver R is an open cell structure, such as a porous media. In a particular embodiment, a distance along the axis between the rod end and the fuel receiver portion located closest to the rod end is less or equal to two times a length of the heating section. In a particular embodiment, the distance is less or equal to one and a half times the length of the heating section, preferably corresponds to the length of the heating section, preferably to about half the lend of the heating section, preferably to about a quarter of the length of the heating section. Such other embodiments are discussed further below.

In the embodiment shown, a threaded insert 132 is received in a cavity 30i defined within the base. As shown in FIG. 3, once this threaded insert is received within the cavity 30i, a portion of the cavity 30i remains free of the threaded insert.

In a particular embodiment, the cavity 30i collects liquid fuel and fuel mist, such that when ignition occurs, said fuel is vaporized and is thereby pushed away from the sleeve 32 and adaptor 30 towards an area of combustion in the combustion chamber 16b. This might lead to increased combustion near the ignitor 20 and potentially resulting in a jet of flame away from the ignitor 20 and towards the combustion chamber 16b and a spray generated by the fuel injectors 22 (FIG. 1).

The sleeve 32 may be slidingly received within the collar 16d. An external diameter of the sleeve 32 may be configured to correspond to an internal diameter of the collar 16d to limit the flow F' of compressed air from entering the combustion chamber 16b via a gap between the sleeve 32 and the collar 16d. Stated otherwise, the outer surface 32a of the sleeve 32 may be in abutment with an inner surface of the collar 16d. The sleeve 32 is discussed in more detail below.

In the embodiment shown, the sleeve 32 is slidingly received within the collar 16d of the combustor liner 16a. The outer surface 32a of the sleeve 32 may be in abutment against an inner surface of the collar 16d. The engagement of the sleeve 32 and the collar 16d may be a sealing engagement that might impede fluid flow communication between the combustion chamber 16b and the spacing S1 via the collar 16d. The sealing engagement might avoid the combustion gases to leak from the combustion chamber 16b toward the spacing S1 between the engine casing 25 and the combustor liner 16a.

The sleeve 32 forms a radial, or annular gap G that circumferentially extends around a full circumference of the heater rod 24b in this embodiment, and more particularly around the tip section 24h of the glow plug 24. The radial gap G extends radially from the heater rod 24b to at most the outer surface 32a of the sleeve 32 relative to the axis A. In a particular embodiment, a depth of the radial gap G taken along the axis A varies from zero to seven times a diameter of the heater rod 24b of the glow plug 24. In a particular embodiment, the depth of the radial gap G taken along the axis A is equal to about a length of a portion of the heater rod 24b that is heated. In a particular embodiment, a value of the length of the portion of the heater rod 24b that is heated is approximately equal to a value of the diameter of the heater rod 24b.

In the embodiment shown, a flow circulation area F is located near the heater rod 24b. The end 24g of the heater rod 24b is positioned in the flow circulation area F. In the embodiment shown, the flow circulation area F is defined in part by the sleeve 32. A constricted area C extends radially relative to the axis A between the sleeve inner surface 32b and the heater rod 24b. The constricted area C is located axially between the flow circulation area F and the body 24a of the plug 24. The constricted area C is designed to have a smaller transversal cross-sectional area than the cross-sectional area of the flow circulation area F. The transversal cross-sectional area is taken on a plane normal to the glow plug axis A. The annular gap G is fluidly connected to the fluid flow circulating area F.

In the embodiment shown, an axial position, relative to the axis A, of an end 24g of the glow plug heater rod 24b corresponds to that of a distal end 32c of the sleeve 32 that is located inside the chamber 16b. In the embodiment shown, the cross-sectional area of the conduit decreases from a proximal end of the sleeve 432 to the constriction C.

In the depicted embodiment, the constricted area C is an annular gap that circumferentially and continuously extends all around the glow plug heater rod 24b in this embodiment. In the embodiment shown, the constricted area is axially offset from the tip section 24h of the heater rod 24b relative to the axis A of the glow plug 24. As shown, the sleeve inner surface 32b at both of the flow circulation area F and the constricted area C is cylindrical and a diameter of the sleeve inner surface 32b at the flow circulation area F is greater than that at the constricted area C. In the embodiment shown, a diameter of the heater rod 24b of the glow plug 24 is slightly less than that of the inner surface 32b of the glow plug 24 at the constricted area C to allow for manufacturing tolerances of the diameter D1 of the heater rod 24b of the glow plug 24 and other tolerances, which can be added together, such as concentricity of a surface of the heater rod 24b of the glow plug 24 relative to the axis A, concentricity of the constriction 30h relative to the inner threaded portion of the adaptor 30.

In a particular embodiment, the sleeve 32 allows a sufficient quantity of the mixture of air and fuel to enter the flow circulation area F to be ignited and, at the same time, protect the glow plug body 24d from the very hot combustion gases within the combustion chamber. In a particular embodiment, the constricted area C impedes the hot combustion gases to flow toward the body 24a of the glow plug 24 thereby protecting the body 24a of the glow plug 24 against these gases. More specifically, and in accordance with a particular embodiment, the constricted area C reduces the heat transferred to the glow plug body when air temperature is very high due to flames or heat soak-back effects after start abort or shutdown.

In the embodiment shown, the end 24g of the heater rod 24b is axially aligned, relative to the axis A, with the igniter liner aperture 16c. Stated otherwise, the end 24g is intersected by a projection of the combustor liner 16a.

Still referring to FIG. 3, the igniter includes a metal portion M that is located closes to the heating section 24h of the heater rod 24b. In the embodiment shown, the metal portion corresponds to the inner surface 32b of the sleeve 32 at the constricted area C. As shown, the heating section 24h protrudes beyond the metal portion. In other words, an entirety of the heating section is axially spaced apart from the metal portion. In a particular embodiment, a distance taken along the axis A from the end 24g of the heater rod 24g to the metal portion is less or equal to two times a length along the axis A of the heating section 24h. In a particular embodiment, the distance taken along the axis A from the end 24g of the heater rod 24g to the metal portion is less or equal to one and a half time the length of the heating section 24h taken along the axis A. In a particular embodiment, the distance taken along the axis A from the end 24g of the heater rod 24g to the metal portion corresponds to the length of the heating section 24h taken along the axis A. In a particular embodiment, the distance taken along the axis A from the end 24g of the heater rod 24g to the metal portion is about half the length of the heating section 24h taken along the axis A.

In the embodiment shown, the end 24g of the heater rod 24b is located inside the combustion chamber 16b. That is, the end 24g traverses a projection 16a' of the combustor liner 16a; the projection corresponding to where the combustion liner 16a would be if the igniter liner aperture 16c were not present. The projection 16a' may be defined by an interpolation of the combustor liner 16a to fill the igniter liner aperture 16c. When seen in a cross-section taken along a plane containing the central axis 11 of the gas turbine engine 10 (as shown on FIG. 3), the projection 16a' follows the peripheral wall of the igniter liner aperture 16c. In a particular embodiment, the end 24g of the heater rod 24b is axially aligned relative to the axis A with the projection 16a'.

Many possible embodiments for the sleeve are described herein. Nonetheless, it should be understood that still other variations are possible without departing from the scope of the present disclosure.

Referring now to FIG. 4, another embodiment of a sleeve is generally shown at 132 with the adaptor 30 and the glow plug 24 that may be identical to those shown in FIG. 3.

Referring now to FIGS. 4 and 5, the sleeve 132 defines fins 132e that extend axially from bases 132f to free tips 132g thereof and radially from the sleeve inner surface 132b to the sleeve outer surface 132a. In the embodiment shown, the fins 132e are circumferentially interspaced around the axis A and are at equal distance from one another. The fins 132e may be non-uniformly distributed around the axis A such that a distance along a circumferential direction relative to the axis A and between two adjacent ones of the fins 132e may vary along the circumference of the sleeve 132. The constricted area C is located at the bases 132f of the fins 132e. In other words, the flow circulation area F axially starts where the fins 132e starts and extends radially from the glow plug heater rod 24b to the sleeve outer surface 132a via spacing S2 between each of two consecutive ones of the fins 132e. The constricted area C as shown is substantially from the heating section 24h, but it can be located close to or in the heating section 24h. The fins may extend intermittently around a full circumference of the heater rod 24b. The sleeve including the fins need not be axisymmetric. In a particular embodiment, the fins form part of the liner portion, also referred to as the collar 16d.

An axisymmetric design can be preferred in the context where the igniter is to be secured to the gas turbine engine by a threaded engagement concentric to the heater rod axis, but in certain cases, such as if the circumferential orientation of the igniter relative to the socket in the gas turbine engine is known, a non-axisymettric design can be preferred to adapt to the specific features of the environment, such as known position of incoming fuel mist, known position of heating air, known local orientation of gravity, etc. Accordingly, in one embodiment, the fins can extend intermittently around a full circumference of the heater rod, whereas in another embodiment, the fins can extend only in one or more portions, e.g. arcs, of the full circumference of the heater rod.

The sleeve 132 includes a surface from which the fins 132e protrudes; the surface containing the bases 132f of the fins 132e and extends from the inner surface 132b to the outer surface 132a. In the embodiment shown, the surface from which the fins 132e protrude is not flat and is sloped such that a distance from the bases 132f of the fins 132e to the end 24g of the heater rod 24b taken along the axis A decreases from the inner surface 132b to the outer surface 132a. The surface from which the fins 132e protrude may be alternatively flat. Other configurations are contemplated without departing from the scope of the present disclosure.

The sleeve 132 extends partially around the heater rod 24b as the fins 132e are circumferentially distributed all around the heater rod 24b. In other words, in this embodiment the sleeve 132 does not continuously extends along a full circumference as gaps are present between two adjacent ones of the fins 132e.

In the embodiment shown in FIGS. 4 and 5, the sleeve 132 includes eight fins 132e. In a particular embodiment, more or less than eight fins may be used. More specifically, twelve fins may be used. In a particular embodiment, a thickness T1 and a number of fins 132e, and the space between the fins 132e which allows the entry of fuel/air mixture, affect ignition performance. In a particular embodiment, a minimum value for the thickness T1 of the fins 132e is about 0.04 to 0.06. In a particular embodiment, the thickness T1 of the fins 132e is about 0.01 inch, preferably 0.02 inch.

The fins 132e may be straight as illustrated on FIG. 4 or may be define an "S-shape" or curved shape in a radial direction and/or an axial direction relative to the axis A. The fins 132e may extend in a circumferential direction relative to the axis such that they wrap around the heater rod 24b. Other configurations are contemplated without departing from the scope of the present disclosure.

In a particular embodiment, the fins 132e, and more particularly the spacing S2 between the fins 132e promote an exposure of the heater rod 24b to the mixture of air and fuel. This might help in igniting said mixture. In a particular embodiment, sections of the circumference of the inner surface 132b of the sleeve 32 where the fins 132e are present amount to at least half of a full circumference of said inner surface 132b.

As shown, the end 24g of the glow plug heater rod 24b extends axially beyond the sleeve 132 and out of the flow circulation area F. Stated otherwise, the end 24g of the heater rod 24b extends axially, relative to the axis A, beyond the igniter liner aperture 16c and into the combustion chamber 16b. Stated otherwise, the end 24g traverses a projection of the combustor liner 16a to reach the combustion chamber.

In the embodiment shown, the end 24g of the heater rod 24b is located inside the combustion chamber 16b. That is, the end 24g traverses a projection 16a' of the combustor liner 16a; the projection corresponding to where the combustion liner 16a would be if the igniter liner aperture 16c were not present. In the embodiment shown, a major portion of the length of the heating section 24h of the heater rod 24b is located inside the combustion chamber 16b.

In the embodiment shown, the metal portion M that is closest to the heating section 24h is the tips 132g of the fins 132e. In a particular embodiment, a distance taken along the axis A from the end 24g of the heater rod 24g to the metal portion is less or equal to two times a length along the axis A of the heating section 24h. In a particular embodiment, the distance taken along the axis A from the end 24g of the heater rod 24g to the metal portion is less or equal to one and a half time the length of the heating section 24h taken along the axis A. In a particular embodiment, the distance taken along the axis A from the end 24g of the heater rod 24g to the metal portion corresponds to the length of the heating section 24h taken along the axis A. In a particular embodiment, the distance taken along the axis A from the end 24g of the heater rod 24g to the metal portion is about half the length of the heating section 24h taken along the axis A.

Referring to FIGS. 6 and 7, another embodiment of a sleeve is generally shown at 232. More specifically, the sleeve 232 includes fins 232e. The fins 232e include each a first section $232e_1$ that extends from the base 232f toward the tip 232g and a second section $232e_2$ that extends from the tip 232g toward the base 232f. In the embodiment shown, a length of the second sections $232e_2$ of the fins 232e along the axis A is about one and a half times the diameter D1 of the heater rod 24b. The second sections $232e_2$ of the fins 232e of the sleeve 232 are grouped in groups 232h of fins 232e that are circumferentially spaced around the axis A. In the embodiment shown, the sleeve 232 includes four groups 232h of fins 232e; each group 232h including three fins 232e for a total of twelve fins. Other configurations are contemplated without departing from the scope of the present disclosure. For each of the groups 232h, the fins 232e extend radially from a wall 232i to the outer surface 232a of the sleeve 232. The wall 232i extends annularly around a portion of a circumference of the sleeve 232. The flow circulation area extends from the heater rod 24b to the outer surface 232a via spacing S2' between each two consecutive ones of the groups 232h of fins 232e.

Figure 8:
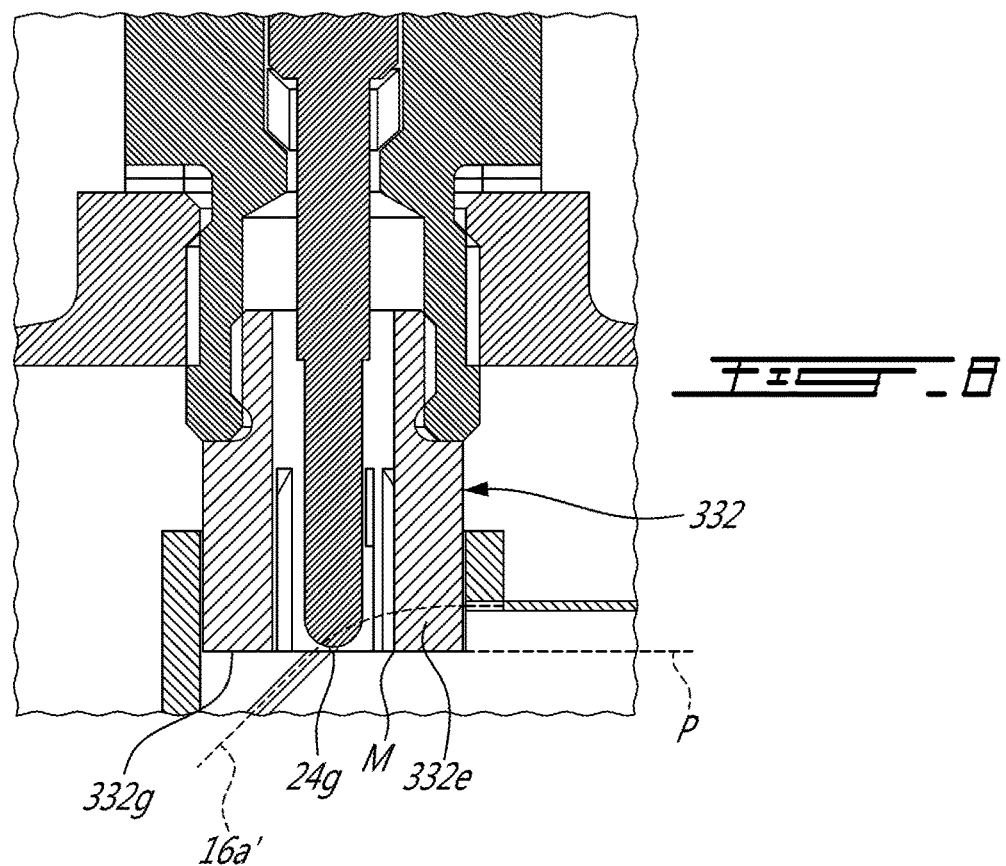
FIG. 8 is a view of an igniter in accordance with another embodiment.

Referring now to FIG. 8, another embodiment of a sleeve is generally shown at 332. The sleeve 332 is similar to the sleeve depicted in FIG. 6, but includes twelve fins 332e instead of eight. Moreover, the end 24g of the glow plug 24 heater rod axially registers with a plane P containing the tips 332g of the fins 332e. In the embodiment shown, the end 24g of the heater rod 24b is axially aligned, relative to the axis A, with the igniter liner aperture 16c. Stated otherwise, the end 24g is intersected by a projection of the combustor liner 16a.

In the embodiment shown, the metal portion M that is closest to the heating section 24h is the tips 332g of the fins 332e. In the embodiment shown, a distance taken along the axis A from the end 24g of the heater rod 24g to the metal portion is zero. In a particular embodiment, the distance is less or equal to two times a length along the axis A of the heating section 24h. In a particular embodiment, the distance taken along the axis A from the end 24g of the heater rod 24g to the metal portion is less or equal to one and a half time the length of the heating section 24h taken along the axis A. In a particular embodiment, the distance taken along the axis A from the end 24g of the heater rod 24g to the metal portion corresponds to the length of the heating section 24h taken along the axis A. In a particular embodiment, the distance taken along the axis A from the end 24g of the heater rod 24g to the metal portion is about half the length of the heating section 24h taken along the axis A.

In the embodiment shown, the end 24g of the heater rod 24b is axially aligned relative to the axis A with the projection 16a' of the igniter liner aperture 16a.

Figure 9:
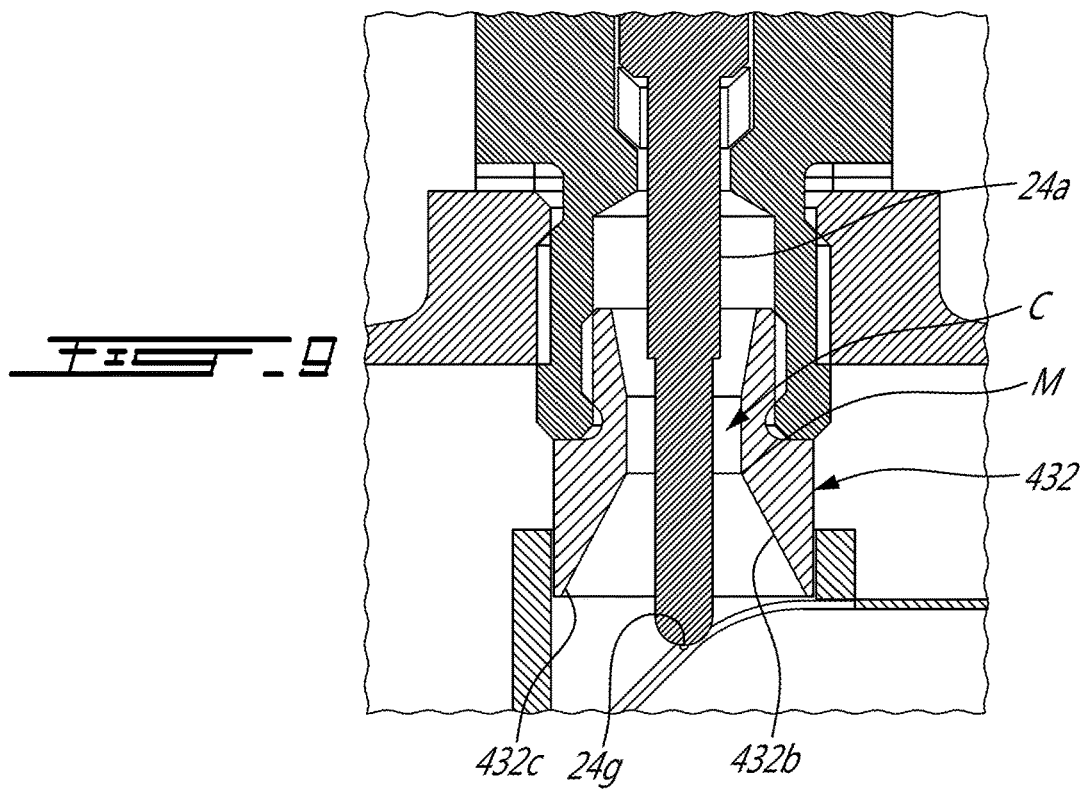
FIG. 9 is a view of an igniter in accordance with another embodiment.

Referring now to FIG. 9, another embodiment of a sleeve is generally shown at 432. The sleeve inner surface 432b at the flow circulation area has a frustoconical shape with a diameter that decreases from its distal end 432c to the constricted area C. As shown, the diameter decreases linearly from the distal end 432c of the sleeve 432 to the constricted area C. In the embodiment shown, the end 24g of the glow plug heater rods 24b protrudes axially beyond the sleeve 432.

In the embodiment shown, the inner surface 432b of the sleeve 432 defines a Venturi. More specifically, the inner surface 432b of the sleeve 432 defines a conduit having a cross-sectional areal taken along a plane normally intersected by the axis A that increases from the constriction C to a distal end 432c of the sleeve 432.

It is understood that different combinations of features described herein are possible in alternate embodiments.

In a particular embodiment, the constricted area C brings liquid fuel, which is on the inner surface 32b of the sleeve 32, closer to the hot part of the heater rod 24b, thereby encouraging vaporization, ignition, and further vaporization and combustion. In a particular embodiment, the presence of a small gap and cavity behind the constricted area C collects liquid fuel prior to ignition, which is then vaporized after ignition. This vaporization might push the fuel and vapor towards the hot part of the glow plug heater rod 24b where it ignites. This might result in a jet of flame that might help to ignite a fuel spray from the fuel injectors 22. In a particular embodiment, this results in successful flame propagation and engine light-up.

The embodiments described herein include various means of collecting liquid fuel that can then be vaporized, either by the heat of the glow plug itself, or by the heat released following initial ignition.

In the embodiment shown, the metal portion M that is closest to the heating section 24h is the constriction C defined by the inner surface 432b of the sleeve 432. In a particular embodiment, a distance taken along the axis A from the end 24g of the heater rod 24g to the metal portion is less or equal to two times a length along the axis A of the heating section 24h. In a particular embodiment, the distance taken along the axis A from the end 24g of the heater rod 24g to the metal portion is less or equal to one and a half time the length of the heating section 24h taken along the axis A. In a particular embodiment, the distance taken along the axis A from the end 24g of the heater rod 24g to the metal portion corresponds to the length of the heating section 24h taken along the axis A. In a particular embodiment, the distance taken along the axis A from the end 24g of the heater rod 24g to the metal portion is about half the length of the heating section 24h taken along the axis A.

Figure 10:
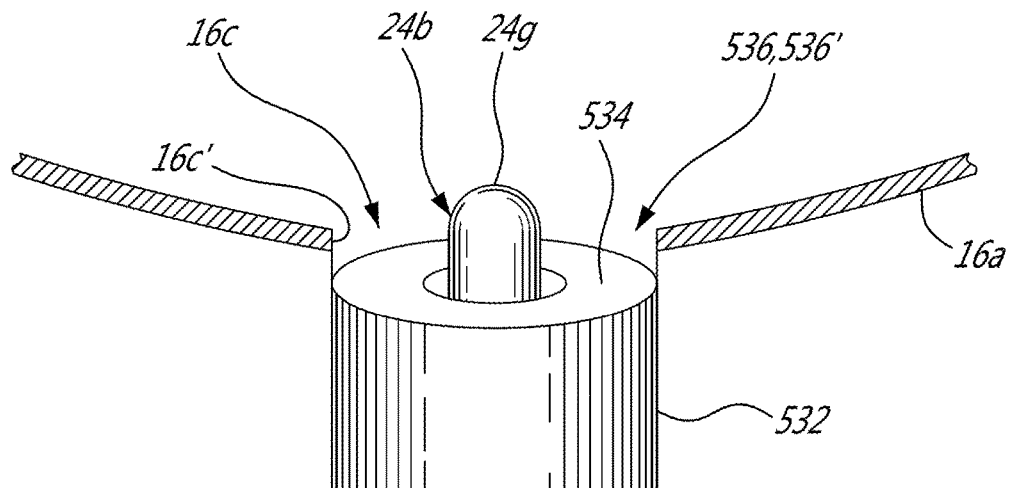
FIG. 10 is a schematic tridimensional view of an igniter in accordance with another embodiment.

Referring now to FIG. 10, another embodiment of a sleeve is generally shown at 532. The sleeve 532 defines an annular plate 534 that faces axially toward the end 24g of the heater rod 24b that extends circumferentially around the heater rod 24b in this embodiment. In the embodiment shown, the sleeve 534 is recessed relative to the combustor liner 16a such as to define a fuel collector 536 that is delimited by the annular plate 534 and a peripheral wall 16c' of the igniter liner aperture 16c. The fuel collector 536 is configured for collecting fuel to be ignited by the heater rod 24b. The fuel collector 536 may have a frustoconical shape. The fuel collector 536 forming a pool 536' for receiving fuel. The peripheral wall 16c' may extend circumferentially about a full circumference of the heater rod 24b. The peripheral wall 16c' may have a frustoconical shape. The peripheral wall 16c' may extend axially beyond the rod end 24g. In a particular embodiment, the peripheral wall may be defined by the adaptor.

Figure 11:
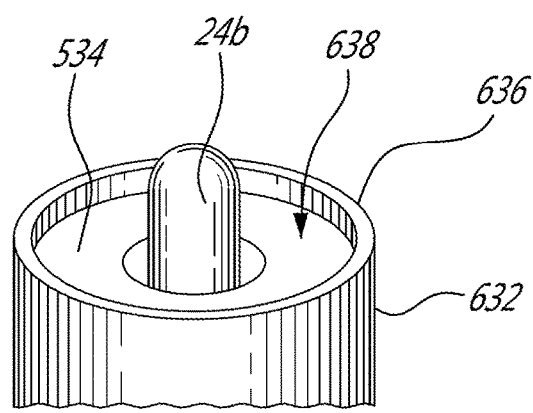
FIG. 11 is a of an igniter in accordance with another embodiment.

Referring now to FIG. 11, another embodiment of a sleeve is generally shown at 632. The sleeve 632 corresponds to the sleeve 532 of FIG. 10 but further includes an annular wall 636 that is connected to a periphery of the annular plate 534. The annular wall 636 extends circumferentially around the heater rod 24b in this embodiment. In the embodiment shown, the fuel collector 638 is delimited by the annular plate 534 and the annular wall 636. The fuel collector 638 is configured for collecting fuel to be ignited by the heater rod 24b. In one embodiment, the fuel collector can extend around a full circumference of the heater rod, continuously or intermittently, whereas in other embodiments, the fuel collector can extend only in one or more portions, or angular segment, of the full circumference of the heater rod.

Figure 12:
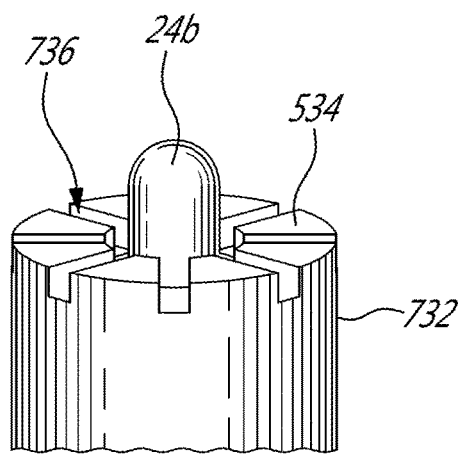
FIG. 12 is an oblique view of an igniter in accordance with another embodiment.

Referring now to FIG. 12, another embodiment of a sleeve is generally shown at 732. The sleeve 632 corresponds to the sleeve 532 of FIG. 10 but slots 736 are defined in the annular plate 534. The slots 736 are configured for receiving therein fuel to be ignited by the heater rod 24b. Stated otherwise, the slots 736 act as fuel collectors.

Figure 13:
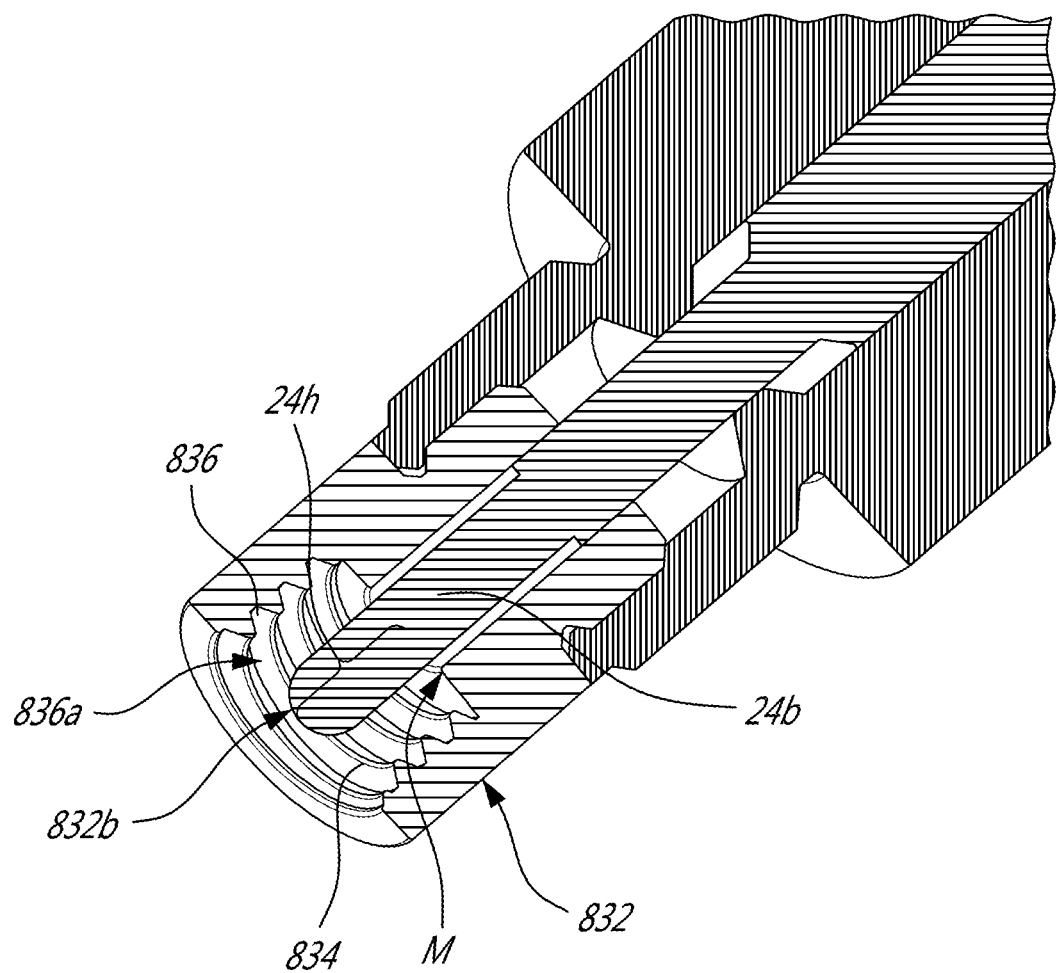
FIG. 13 is an oblique view of an igniter in accordance with another embodiment.

Referring now to FIG. 13, another embodiment of a sleeve is generally shown at 832. In the embodiment shown, the sleeve 832 has ridges 834 at the inner surface 832b. A channel 836 is located between two adjacent ones of the ridges 834. The channels 836 act as fuel collectors for containing fuel to be ignited by the heater rod 24b. As shown, the channels 836 surround the heating section 24h. The pocket may include the channels; the channels being axially distributed.

The sleeve includes pockets 836a defined by the channel 836. The pockets 836a have a radial depth that extends radially relative to the axis A from a bottom of the channels 836 to an apex of the ridges 834. In one embodiment, the pocket can extend around a full circumference of the heater rod, continuously or intermittently, whereas in other embodiments, the pocket can extend only in one or more portions, or angular segment, of the full circumference of the heater rod. The pocket may be defined between threads defined by the inner surface of the sleeve. The pocket may extend around a full circumference of the inner surface of the sleeve.

Figure 14:
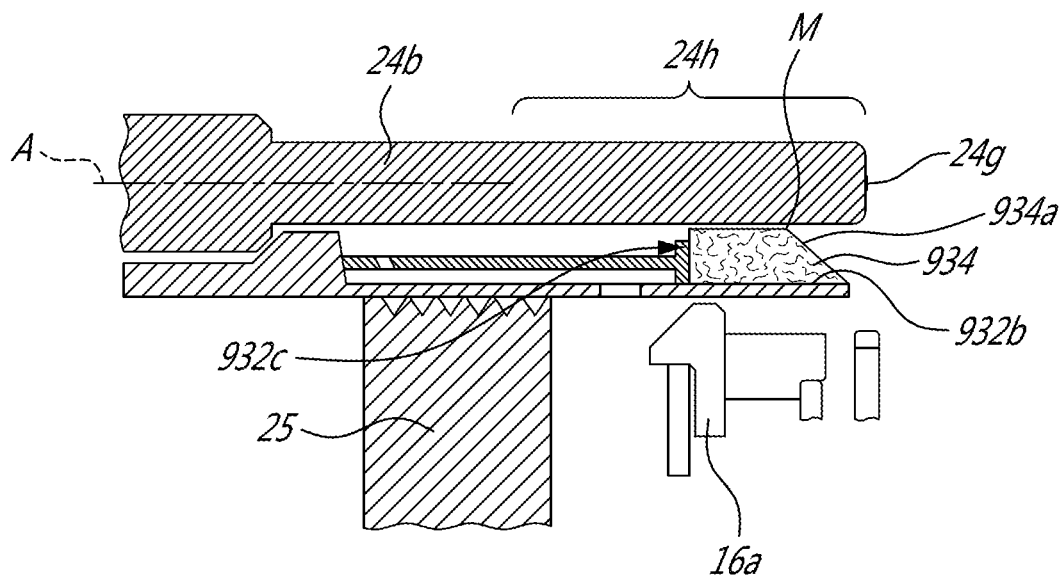
FIG. 14 is a partial, schematic, cross-sectional view of an igniter in accordance with another embodiment.

Referring now to FIG. 14, another embodiment of a sleeve is generally shown at 932. In the embodiment shown, the sleeve 932 circumferentially extends at least partially around a portion of the heating section 24h of the heater rod 24b. Herein, the expression "at least partially around" means that the sleeve is present a plurality of circumferential locations distributed all around the heating section, but the sleeve 932 need not continuously extend all around a full circumference about the axis A. Herein, the expression "a portion of the heating section 24h" means a portion taken along the axis A. In a particular embodiment, the portion of the heating section 24h includes at least half of a total length of the heating section 24h taken along the axis A. A porous medium, also referred to as a structure having open porosity, 934 is received within the sleeve 932 and extends radially between the heater rod 24b and the inner surface 932b of the sleeve 932 and at least partially circumferentially around the heater rod 24b. The porous medium 934 may be metal foam, a porous ceramic such as a ceramic sponge, a 3D printed lattice or any structure known in the art that defines porosities in which fuel may be received. The porous medium 934 is a structure having open porosities. In one embodiment, the structure having open porosity can extend around a full circumference of the heater rod, continuously or intermittently, whereas in other embodiments, the structure having open porosity can extend only in one or more portions, or angular segment, of the full circumference of the heater rod. In a particular embodiment, the foam is radially spaced apart from the heater rod 24b by a gap. The gap may extend around a full circumference of the heater rod 24b or around a portion of said circumference. This might allow the foam to expand when exposed to hot gas. In a particular embodiment, the structure having open porosity has an axial end being distal from the base; the axial end of the structure sloping inwardly and axially towards the base. The structure having open porosity may have a plurality of radially extending slots forming a fluid circulation area around the heating section of the heater rod. The foam need not be axisymmetric. In a particular embodiment, the structure having open porosity may form part of the liner. In other words, the structure having open porosity may be secured to the collar 16d.

In the embodiment shown, the porous medium defines an annular surface 934a that circumferentially extends around the heater rod 24b. In the embodiment the annular surface is angled such that as to face the heating section 24h of the heater rod 24b. Stated otherwise, the annular surface 934a is an axial end that is distal from the glow plug body 24a; the axial end of the porous medium 934 sloping radially inwardly and axially towards the heater rod 24b relative to the axis A. This can offer a greater surface area to be heated by the heating section 24h compared to a configuration in which the annular surface 934a is perpendicular to the axis A.

In the embodiment shown, the porous medium 934 is connected to the inner surface 932b of the sleeve 932. Alternatively, the porous medium 934 may be connected to an end wall 932c of the sleeve 932; the end 24g of the heater rod 24 protruding axially beyond the end wall 932c. The porous medium 934 may be in abutment against the heating section 24h of the heater rod 24b.

It is understood that the porous medium needs not to circumferentially extend around a full circumference of the sleeve 932. For instance, the porous medium 932 may fill the spacing S2 (FIG. 5) located between two adjacent fins 132e (FIG. 5) of the sleeve 132 of FIG. 5. In other words, there is presence of the porous medium at a plurality of circumferential locations around the axis A but the porous medium need not circumferentially extends along a full circumference. In a particular embodiment, sections of the circumference of the inner surface of the sleeve where the porous medium is present amount to at least half of a full circumference of said inner surface.

In the embodiment shown, the metal portion M that is closest to the heating section 24h is on the porous medium 934. More specifically, the closes metal portion is located on the annular surface 934a of the porous medium 934 and at a radially inward-most point on said surface 934a. In a particular embodiment, a distance taken along the axis A from the end 24g of the heater rod 24g to the metal portion is less or equal to two times a length along the axis A of the heating section 24h. In a particular embodiment, the distance taken along the axis A from the end 24g of the heater rod 24g to the metal portion is less or equal to one and a half time the length of the heating section 24h taken along the axis A. In a particular embodiment, the distance taken along the axis A from the end 24g of the heater rod 24g to the metal portion corresponds to the length of the heating section 24h taken along the axis A. In a particular embodiment, the distance taken along the axis A from the end 24g of the heater rod 24g to the metal portion is about half the length of the heating section 24h taken along the axis A.

In one embodiment, the sleeve can be designed to extend circumferentially around the heater rod, and radially between the heater rod and the aperture in the combustion chamber liner, essentially acting as a plug to limit or prevent the passage of compressed air between the heater rod and the combustion chamber liner. In some embodiments, especially if the sleeve is structurally connected to a base of the igniter, a small radial gap will nonetheless be left between the combustion chamber liner and the sleeve to facilitate insertion of the sleeve in the combustion chamber liner, but it may be preferred to otherwise minimize this radial gap. In one embodiment, the combustor liner plug extends continuously around the entire circumference of the heater rod.

The combustor liner plug extends circumferentially around the heater rod 24b. The combustor liner plug is sized and configured to extend inside the combustor liner aperture of the gas turbine engine when the base B is connected to the casing 25 between the heater rod 24b and a periphery of the aperture 25a. The combustor liner plug forms part of the sleeve which is structurally connected to the base B and protrudes along the axis A from the base B towards the rod end 24g; the combustor liner plug being at an end of the sleeve remote from the base. The combustor liner plug may have a portion connected to the heater rod.

Figure 15:
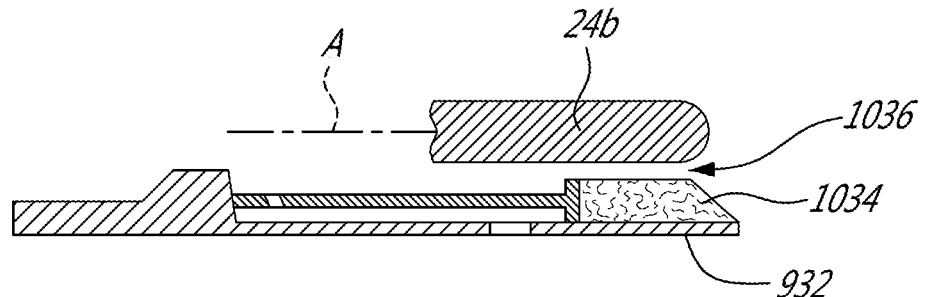
FIG. 15 is a partial, schematic, cross-sectional view of an igniter in accordance with another embodiment.

Referring now to FIG. 15, the porous medium 1034 has a radial thickness relative to the axis A that is less than that of the porous medium 934 of FIG. 14 such that an annular spacing 1036 is created radially between the heating section 24h of the heater rod 24b and the porous medium 1034. This annular spacing 1036 might allow fuel to circulate between the porous medium 1034 and the heater rod 24b and offers a greater surface through which the fuel may be able to penetrate the porous medium 1034.

Figure 16:
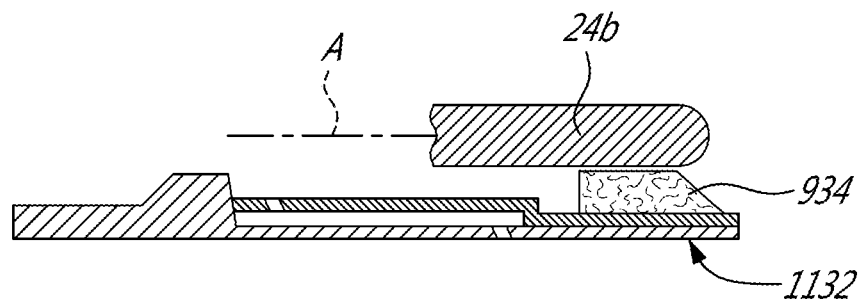
FIG. 16 is a partial, schematic cross-sectional view of an igniter in accordance with another embodiment.

Referring now FIG. 16, another embodiment of a sleeve is generally shown at 1132. The sleeve 1132 is similar to the sleeve 932 of FIGS. 14 and 15, but the end wall 932c is axially offset from the porous medium 934. This might allow the fuel to circulate through the porous medium 934 in an axial direction relative to the axis A to reach a portion of the heater rod 24b that is behind the porous medium 934.

Referring now to FIGS. 17 and 18, in the embodiment shown, the adaptor 30 defines an inlet 30m' provided in the form of slots 30m extending externally to the adaptor 30 and thereacross into the ventilation path 42. The inlet 30m' is fluidly connected to the spacing S1. The slots 30m are located axially between the proximal end of the sleeve 1132 and the constriction C. A swirler 40 is received in the portion of the cavity 30i that is free of the sleeve. The annular gap G around the heater rod 24b forms a ventilation path 42 that extends circumferentially around the heater rod 24b and is located radially between the swirler and the adaptor 30. The ventilation path 42 extends axially along at least a portion of the heater rod 24b. In one embodiment, the ventilation path extends around the entire circumference of the heater rod, in a manner to cool the heater rod in a relatively uniform manner. The swirler has an annular wall 40a and a plurality of helical vanes 40b that extend from the annular wall 40a toward a center of the annular wall 40a. The helical vanes 40b extend both in the axial and circumferential directions relative to the axis A such that they wrap around the axis A. Spacing 40c are defined between the helical vanes 40b, which are configured to impart a circumferential component to a flow circulating there between.

The ventilation path 42 extends from an inlet 42a to an outlet 42b. The inlet 42a is fluidly connectable to the spacing S1 between the engine casing 25 and the combustor liner 16a. The outlet 42b extends circumferentially around the glow plug heater rod 24b and oriented axially relative to the axis A. The outlet is fluidly connectable to the combustion chamber. The ventilation path 42 may extend through the gap G. The ventilation path 42 may extend axially along a portion of the heater rod located between the heating section and the base. The inlet 42a of the ventilation path 42 may be connected to the outlet 42b via the constriction C. The ventilation path 42 may extend through a second broadening section 432$b_2$ located upstream of the constriction C relative to the flow circulating in the ventilation path 42. The ventilation path 42 may extend through the second broadening section, the constriction, and the broadening section.

In a particular embodiment, a tip portion of the sleeve is made of a different material having a higher resistance to heat than a remainder of the sleeve.

The inlet 42a of the ventilation path 42 may be extending radially through the sleeve. Gas may be drawn across this ventilation path 42 via a difference of pressure between the compressed gas path (e.g., spacing S1) and the combustion chamber during normal operation.

In a particular embodiment, the ventilation path has an inlet segment which connects the compressed gas path with a gap between the sleeve and the heater rod, that gap may act as a second segment, and may broaden before reaching the heating section. This might reduce the likelihood of blowing out the flame. Alternately, the ventilation path 42 may exit across the sleeve. The ventilation path 42 may extend along the metal to ceramic junction J.

In a particular embodiment, the ventilation path may be formed within the sleeve and extend axially along a distal end portion of the sleeve. The sleeve may define a plurality of circumferentially interspaced conduits. The circumferential conduits may each extend along a portion of a circumference to induce a swirl in the air, to create a vortex. This might create a broadening flow. In a particular embodiment, a ventilation path may be created to blow fuel upward.

More specifically, the slots 30m are fluidly connected to the ventilation path 42, which is fluidly connected to the spacing 40c between the helical vanes 40b, which are fluidly connected to the flow circulation area F. The slots 30m receives compressed air from the spacing S1 between the engine casing 25 and the combustor liner 16a. The compressed air is directed along the axis A away from the end 24g of the heater rod 24b. Then, the compressed air flows radially to reach the spacing 40c and flows along and around the axis A toward the end 24g.

In the embodiment shown, the inner surface 432b of the sleeve 432 defines a convergent-divergent nozzle. More specifically, the inner surface 432b of the sleeve 432 defines a broadening section 432b1. The cross-sectional area of the ventilation path 42 at the broadening section 432b1 increases past the constricted area C to decrease a velocity of the compressed air. This might reduce the cooling of the heater rod 24b in comparison to a configuration that does not present the increase in the cross-sectional area. In a particular embodiment, the swirler 40 increases a cooling capability of the compressed air around the intermediate section 24d of the glow plug body 24a. In a particular embodiment, the increase in the cross-sectional area of the inner surface 432b of the sleeve 432 decreases a cooling capability of the cooling air around the heating section 24h of the heater rod 24b.

In the embodiment shown, the swirler 40 has alignment features 40d' provided in the form of pins 40d extending axially relative to the axis A and being secured to the wall 40a. The pins 40d are slidingly received within corresponding aperture 30n of the adaptor 30 for avoiding the swirler 40 to rotate relative to the axis A. Stated otherwise, the pins maintain a circumferential alignment of the swirler with respect to the adaptor 30.

In a particular embodiment, the swirler may be located radially between the heating section 24h of the heater rod 24b and the sleeve 432 relative to the axis A; the swirler being axially aligned with the heating section 24h relative to the axis A. In such a case, the sleeve 432 may define apertures locate axially above the heating section 24h to allow the compressed air to circulate within the sleeve 432 and downwardly toward the end 24g of the heater rod 24b via the spacing between the vanes of the swirler 40.

In a particular embodiment, the compressed air that flows along the ventilation path 42 may be used to cool down the sleeve at locations proximate sensitive parts of the glow plug 24.

Figure 19:
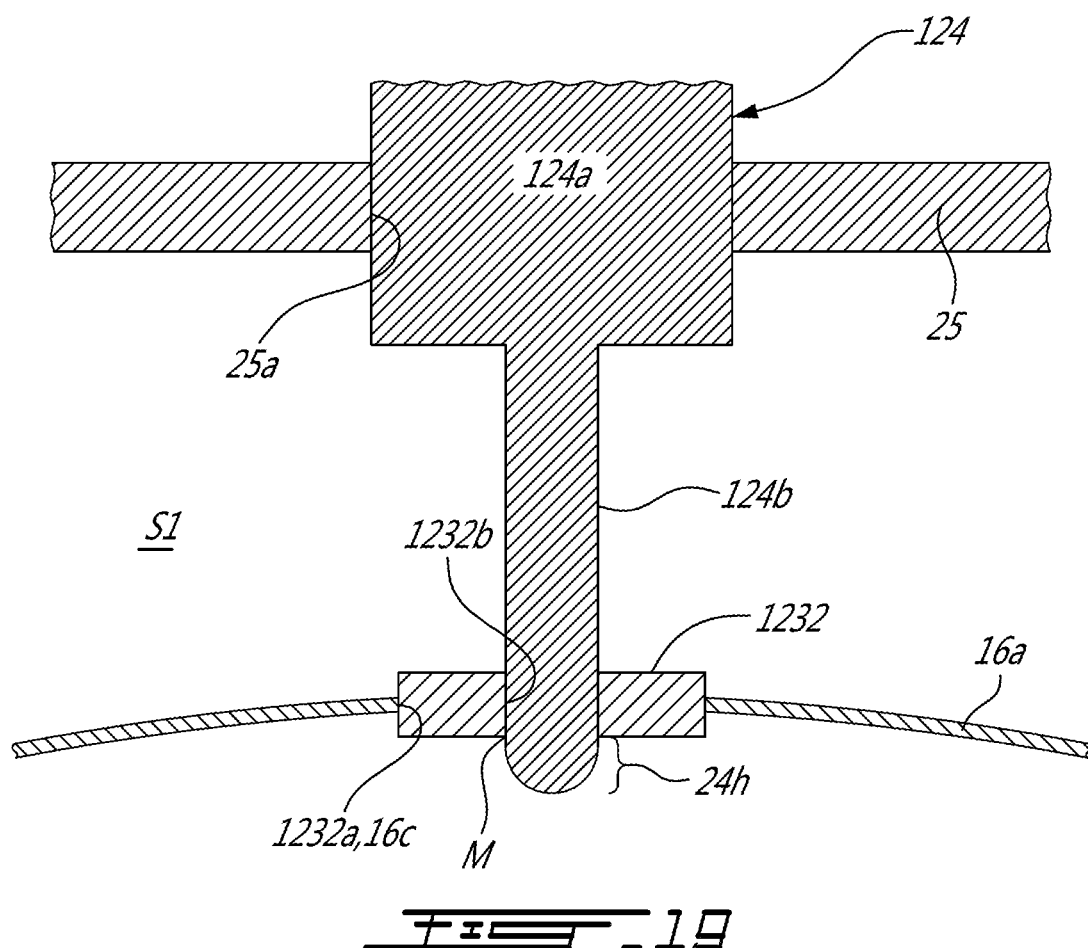
FIG. 19 is a schematic cross-sectional view of an igniter in accordance with another embodiment.

Referring now to FIG. 19, a glow plug in accordance with another embodiment is generally shown at 124. The glow plug 124 includes a body 124a and a heater rod 124b. The glow plug body 124a is configured to be directly connected to the igniter aperture 25a of the engine casing 25 using threads.

In the embodiment shown, a sleeve 1232 is connected to the heater rod 24b. The sleeve 1232 is provided in the form of a ring that circumferentially extends around a full circumference of the heater rod 24b. The sleeve 1232 has an outer surface 1232a that is configured to be in abutment with the peripheral wall of the combustor liner aperture 16c of the combustor liner 16a. An inner surface 1232b of the sleeve 1232 is in abutment with the heater rod 24. In the embodiment shown, the cooperation of the combustor liner 16a, the sleeve 1232, and the heater rod 24b creates a sealing connection that prevents the combustion gases from leaking from the igniter liner aperture 16c toward the spacing S1. In other words, the sleeve 1232 fills a gap that would otherwise be present between the heater rod 24b and the combustor liner 16a. It is understood that the sleeve 1232 may abut either one of an inner or outer surface of the combustor liner 16a.

In a particular embodiment, the sleeve 1232 may define fins, may contain a porous medium, may define a cavity to act as a fuel collector. In a particular embodiment, the sleeve 1232 may be defined by the heater rod 24b. The sleeve 1232 may be connected to the heater rod 24b by being heat shrunk there on. Any other methods of fastening the sleeve 1232 to the heater rod 24b known in the art may be used without departing from the scope of the present disclosure.

In the embodiment shown, the metal portion M that is closest to the heating section 24h is a face of the sleeve 1232 that faces away from the body 124a. In a particular embodiment, a distance taken along the axis A from the end 24g of the heater rod 24g to the metal portion is less or equal to two times a length along the axis A of the heating section 24h. In a particular embodiment, the distance taken along the axis A from the end 24g of the heater rod 24g to the metal portion is less or equal to one and a half time the length of the heating section 24h taken along the axis A. In a particular embodiment, the distance taken along the axis A from the end 24g of the heater rod 24g to the metal portion corresponds to the length of the heating section 24h taken along the axis A. In a particular embodiment, the distance taken along the axis A from the end 24g of the heater rod 24g to the metal portion is about half the length of the heating section 24h taken along the axis A.

Figure 20:
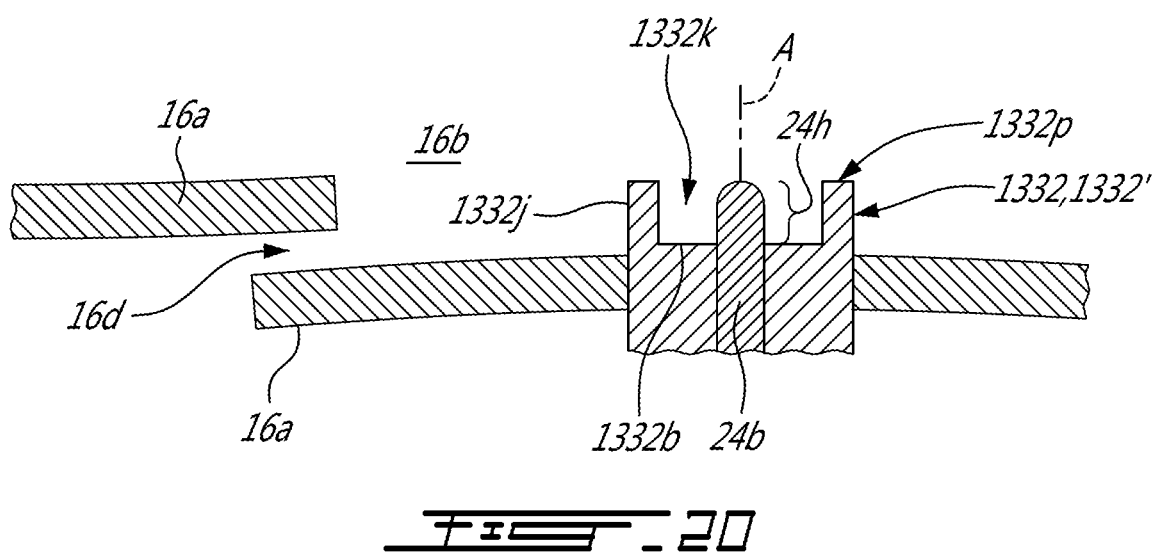
FIG. 20 is a schematic cross-sectional view of an igniter in accordance with another embodiment.

Referring now to FIG. 20, the combustor liner 16a may define a gap 16d for allowing compressed air from flowing along an inner surface of the combustor liner 16a. The compressed air is used to cool the combustor liner 16a via film cooling. However, the film of air created thereby might impede the ability of the heater section 24h of the heater rod 24b to ignite the mixture of air and oil.

In the embodiment shown, the sleeve 1332 is a flow impeding member 1332' and includes an annular wall 1332j that circumferentially extends around the heater rod 24b to shield the heater rod form the film of cooling air. More specifically, the annular wall 1332j encloses a plenum 1332k that is fluidly connected to the combustion chamber 16a and in which a velocity of the fluid circulating therein is less than that in a remainder of the combustion chamber 16b. The flow impeding member 1332' may extend along the axis A and have a distal end spaced from the base B and extending axially relative to the axis A beyond the rod end 24g. The flow impeding member 1332' may be sized and configured such that the distal end extends into a combustion chamber of the gas turbine engine upon the base connected to the casing 25. In a particular embodiment, the flow impeding member extends around at least haft of a circumference around the glow plug heater rod 24b. The flow impeding member 1332' may be structurally connected to the base B and may protrude along the axis A from the base toward the rod end 24g. The flow impeding member 1332' may have a portion connected to the heater rod 24b between the rod end 24g and the base B. The flow impeding member 1332' may have a portion connected to the glow plug heater rod 24b between the rod end 24g and the base B.

Indeed, the combustor liner can be provided with cooling apertures designed to provide a curtain of cooling air along the inner surface of the combustor liner. The sleeve can have an annular wall which protrudes inwardly from the combustor liner and shields the heater rod from such a curtain of cooling air. In one embodiment, the protruding sleeve portion can extend around a full circumference of the heater rod, continuously, whereas in other embodiments, the protruding sleeve can extend only in one or more portions, or angular segments, of the full circumference of the heater rod. This can be the case, for instance, in a situation where the orientation of the igniter in its socket will be known beforehand, in which case it can be preferred to use a protruding sleeve portion only between the heater rod and the source of the curtain of cooling air, for instance.

In the embodiment shown, the sleeve 1332 has a flat end 1332p that defines a annular wall circumferentially extending around the heater rod 24b; the annular wall being normal to the axis A. Having such a flat end 1332p might allow the sleeve 1332 to contain more fuel than a configuration where the end 1332p is sloped.

Referring now to FIG. 21, a glow plug in accordance with another embodiment is generally shown at 224. The glow plug 224 has a body 224a and a heater rod 224b protruding from the body 224a. The heater rod 224b has a section 224j located between the heating section 224h and the body 224a. The section 224j is configured to block the igniter liner aperture 16c to impede the combustion gases from flowing out of the combustion chamber 16b in the spacing S1. The body 224a may be fastened to the igniter aperture peripheral wall 25a' via corresponding threads defined by the body 224a.

In the embodiment shown, a blocking member BM is provided. The blocking member BM extends across the igniter aperture 25a and is configured to block fluid communication across the igniter aperture 25a. The blocking member BM may be used to fluidly disconnect the igniter from a fuel source (e.g., fuel tank) such that no fuel is injected around the heating rod 224b.

Referring now to FIG. 22, a coil element 50 may be received within the sleeve 32. The coil element 50 may be in contact with the heater rod 24b. The coil element 50 wraps around the heater rod 24b and extends radially from the heater rod 24b to the inner surface 32b of the sleeve 32. In other words, by wrapping around, the coil element 50 extends both in a circumferential direction and a radial direction relative to the axis A. A plurality of gaps 50a are defined between portions of the coil element 50 and are configured for receiving therein fuel. The heater rod 24b transfers its heat to the coil element 50 thereby increasing a surface area being heated. This might help in igniting the mixture of fuel and air. As shown more clearly on FIG. 22a, a radial depth relative to the axis A of the coil element 50 corresponds to a depth of the sleeve 32 relative to the axis A.

Figure 23A:
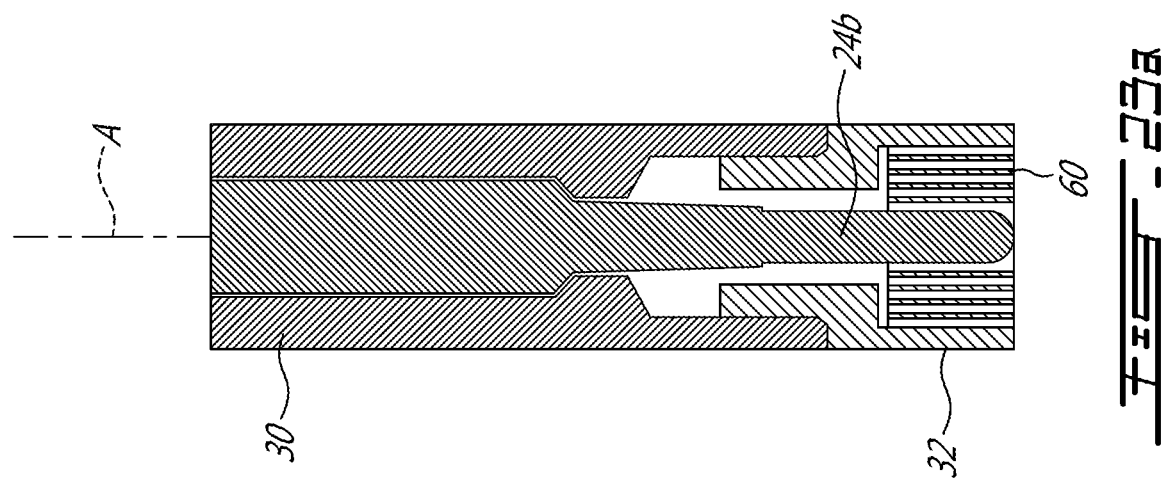
FIG. 23a is a schematic cross-sectional view of the igniter of FIG. 23.
Figure 23:
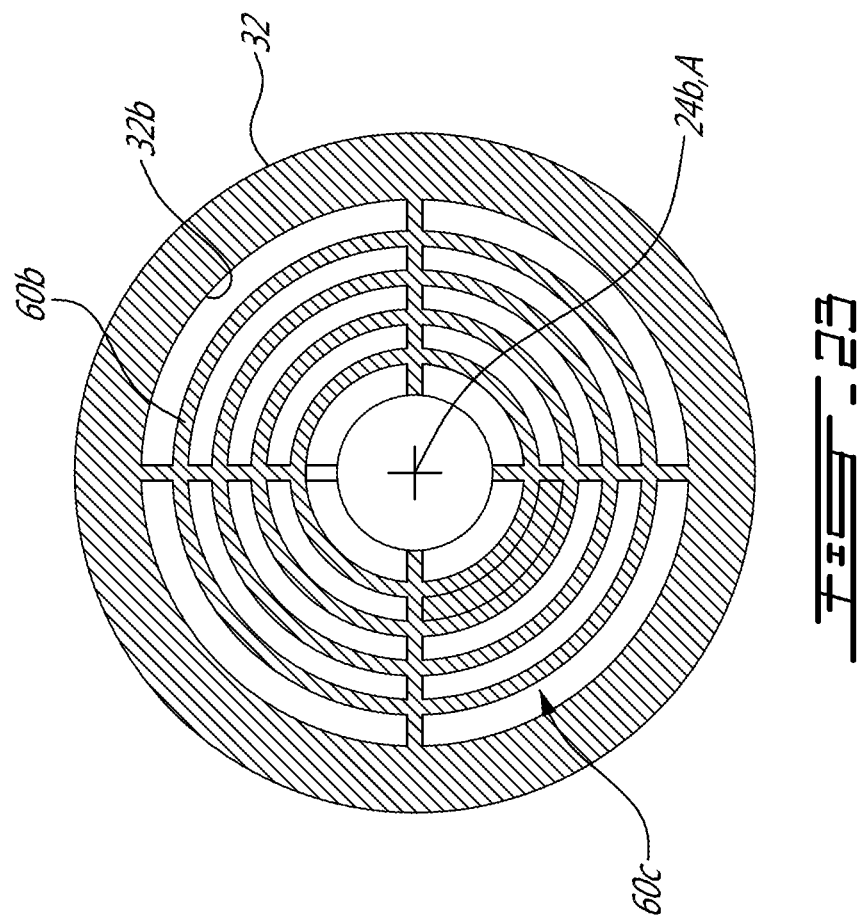
FIG. 23 is a schematic bottom view of an igniter in accordance with another embodiment.

Referring now to FIG. 23, a coil structure 60 may be received within the sleeve 32. The coil structure 60 includes ribs 60a that extends from the heater rod 24b to the inner surface 32b of the sleeve 32. Coil elements 60b are each provided in an annular form and circumferentially extends around a full circumference of the heater rod 24b. The coil elements 60b are connected to the ribs 60a. The coil elements 60b are radially interspaced between the heater rod 24b and the sleeve 32 and define gaps 60c radially therebetween relative to the axis A. The gaps 60c are configured for receiving therein fuel. The heater rod 24b transfers its heat to the coil elements 60b thereby increasing a surface area being heated. This might help in igniting the mixture of fuel and air. As shown more clearly on FIG. 23a, a radial depth relative to the axis A of the coil structure 60 corresponds to a depth of the sleeve 32 relative to the axis A.

Figure 24:
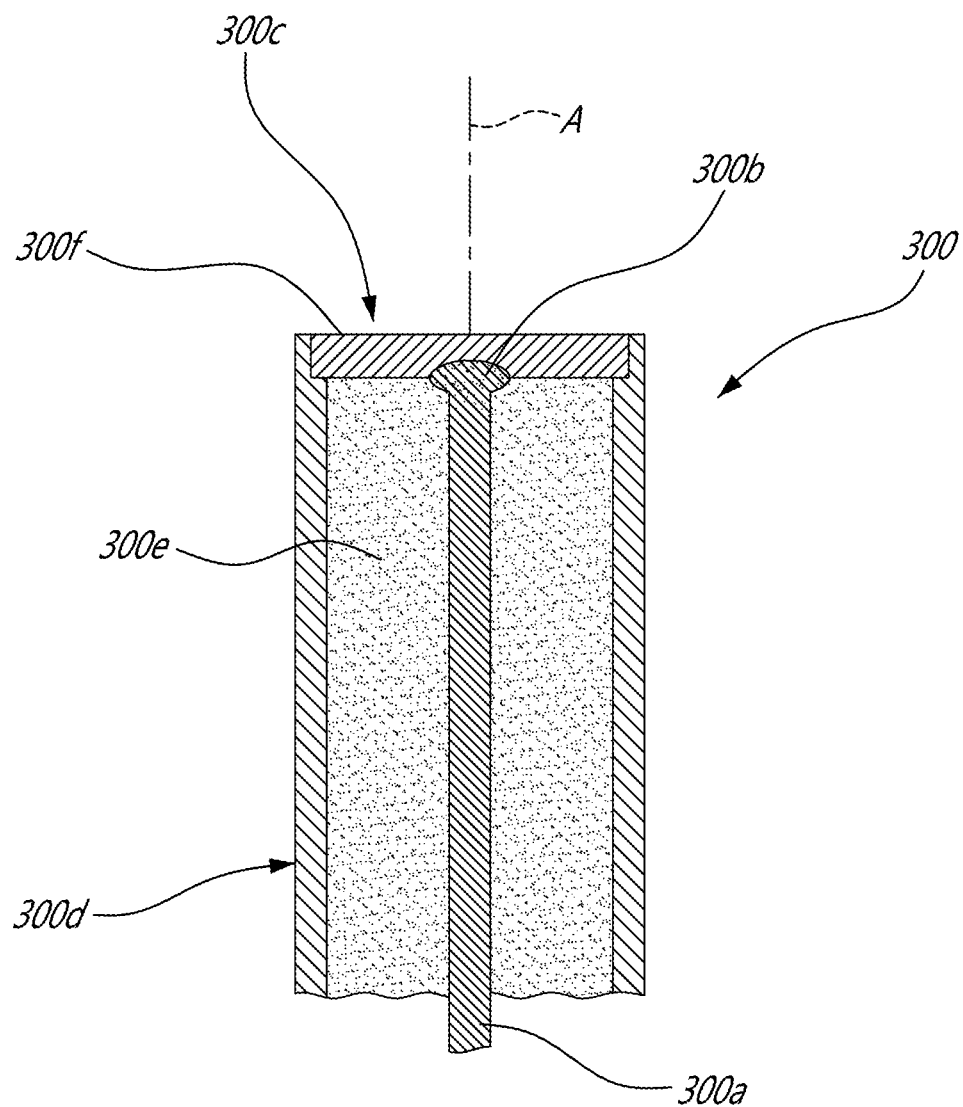
FIG. 24 is a partial, schematic cross-sectional view of a heater rod of a glow plug in accordance with another embodiment.

Referring now to FIG. 24, an igniter 300 in accordance with a particular embodiment is shown. The igniter 300 includes a base (not shown) and a conductor 300a extending along an axis A from the base to an end 300b. A heating element 300c is electrically connected to the end 300c of the conductor 300a. An outer casing 300d circumferentially extends around the conductor 300a. The outer casing 300c is in heat exchange relationship with the heating element 300c and radially spaced apart from the conductor 300a by a gap 300e. The gap 300e is filled with an insulator. In the embodiment shown, electricity is routed from a power source (e.g., battery) to the heating element 300c via the conductor 300a and is directed from the heating element 300c back to the power source via the outer casing 300d. The power source may be a source of direct current. The heating element 300c may be a ceramic. The heating element 300c may provide for a greater surface area that becomes incandescent than that of a tip of a conventional glow plug. In a particular embodiment, the electricity may be carried back and forth from the power source via the conductor 300a.

In a particular embodiment, the conductor is made of copper. The heating element may be a conductive ceramic heating element. The housing may be in contact with the heating element. The heating element has a surface 300f facing away from the conductor. The surface may define a pattern. The pattern may be, for instance, grooves, and/or ridges that might increase the surface area in contact with the fuel. The heating element may be porous. In such a design, the heating element can be less vulnerable to damage than if the heating element were exposed.

In a particular embodiment, the disclosed igniter 300 allows for a greater surface area for a same power compared to the igniter 24 disclosed above. The increased surface area might improve the probability of igniting fuel/air mixtures by hot surface ignition. The heated surface may be wider than the igniter 24 disclosed above. This might allow the fuel/air mixture in the middle of the heated surface to reach the temperature needed to ignite. The ceramic might improve the life of the adapter by protecting the metal adapter. It might be possible to use a less expensive metal for the housing since the ceramic might protect the tip.

In a particular embodiment, the fins 132e, the porous medium 934, and the ridges/channels 834, 836 may increase a surface area that is heated. In other words, without the fins, the porous medium, or the ridges, only the heating section 24h of the heater rod 24b would be heated. By surrounding the heating section 24h by the fins, the porous medium, or the channels, heat is transferred by conduction and/or radiation from the heating section 24h to the fins, the porous medium, or the channels. Having more heated surface area might help in igniting the mixture of air and fuel.

In a particular embodiment, the sleeve 32 acts as a collector to collect fuel prior to be ignited by the glow plug 24. In a particular embodiment, the sleeve 32 provides a plenum around the heater rod 24b; a velocity within the plenum being less than that outside the plenum. Such a plenum might help in igniting the mixture of air and fuel that enters the plenum. Moreover, by having a velocity of the mixture inside the plenum that is lower than that outside the plenum might avoid cooling the heating section 24h, which would impair the ability of the heating section 24h to ignite the mixture. The sleeve 32 may therefore act as a flame stabilizer.

Figure 25:
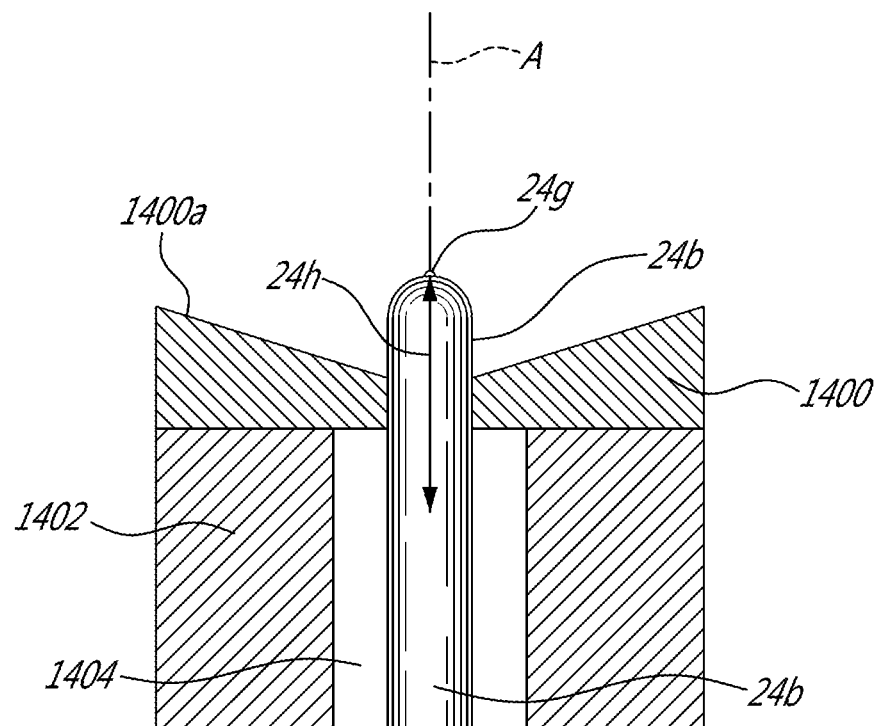
FIG. 25 is a partial, schematic, cross-sectional view of an igniter in accordance with another embodiment.
Figure 26:
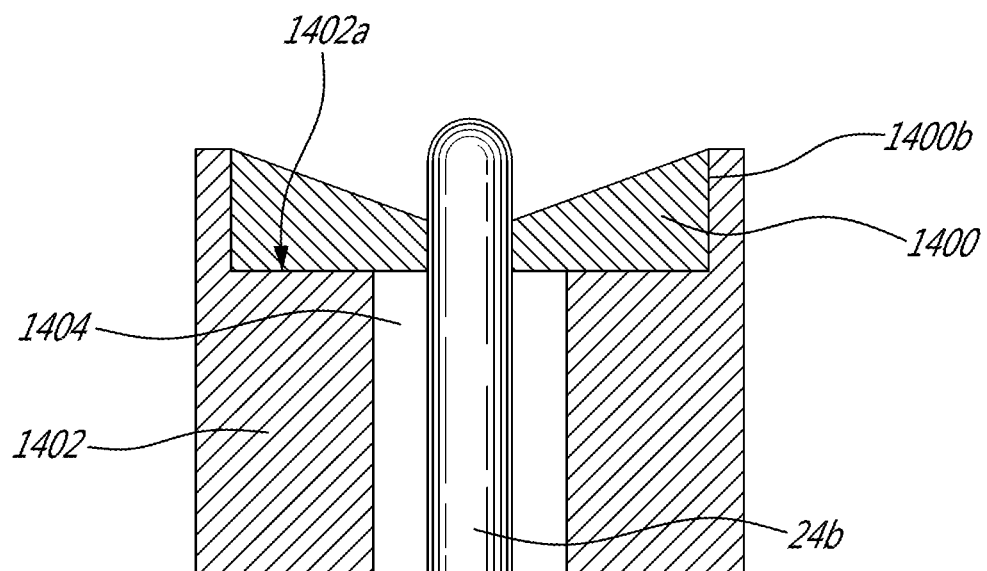
FIG. 26 is a partial, schematic cross-sectional view of a variation of the igniter of FIG. 25.

Referring now to FIGS. 25 and 26, there is disclosed an igniter including a heat spreader 1400 extending circumferentially around the glow plug heater rod 24b. The heat spreader 1400 may be in heat exchange relationship with the glow plug heater rod 24b for dissipating heat generated by the glow plug heater rod 24b. The heat spreader may be axially aligned with the heating section 24h of the glow plug heater rod 24b.

The igniter further has a housing 1402 circumferentially surrounding the glow plug heater rod 24b. The rod end 24g may protrude beyond the housing 1402. The heat spreader 1400 may be secured to an end of the housing 1402.

In the embodiment shown, the housing 1402 and the glow plug heater rod 24b are radially spaced from each other by a gap 1404 axially extending at least along a portion of the glow plug heater rod 24b. The gap 1404 may be filled with an insulation material. In the depicted embodiment, the heat spreader circumferentially extends around a full circumference of the glow plug heater rod.

The heat spreader has an annular face 1400a circumferentially extending around the glow plug heater rod 24b. The annular face 1400a may be beveled toward the glow plug heater rod 24b.

The heat spreader 1400 may be made of a metallic material. The heat spreader 1400 may be made of a conductive ceramic material. The heat spreader 1400 may be secured to be in contact with the glow plug heater rod 24b. The heat spreader 1400 may be made of Inconel™. The heat spreader 1400 may define porosities.

Referring now to FIG. 26, the heat spreader 1400 may be circumferentially surrounded by the housing 1402. More specifically, the heat spreader 1400 has an cylindrical face 1400b that may be in contact with the housing 1402. The housing 1402 may define a shoulder 1402a for abutment against the heat spreader 1400.

In a particular embodiment, a catalyst may be deposited wherever fuel is expected to accumulate and where a temperature is expected to be high. The catalyst may stay hot due to the combustion process. The catalyst may, for instance, be located on the foam, the porous media, the spiral, the ridges, the inner surface of the sleeve, etc.

In some embodiments, the igniter can be secured to the casing by fasteners, for instance, rather than torque. In such other embodiments in particular, it can be easier to predetermine the circumferential orientation or the igniter around its axis, when assembled. In such cases, it can be preferred to use specifically provide the igniter with an asymmetrical design suited for the particular angular orientation. Accordingly, sleeve, flow impeding member, peripheral wall, ridges, grooves, heating element, heat spreader may be axisymmetric.

The above description is meant to be exemplary only, and one skilled in the art will recognize that changes may be made to the embodiments described without departing from the scope of the invention disclosed.

For example, the gas turbine engine 10 has been depicted as a turbofan, but the disclosed igniters may be used in any types of gas turbine engines, such as turboprop, turboshaft, auxiliary power unit, jet turbine combined heat and power generators, jet turbine powered surface vehicles.

Some of the igniter embodiments presented above have an axisymmetric design. The axisymmetricity is optional, and may be useful only in some embodiments. Some embodiments have non-axisymmetric designs. Indeed, axisymmetric designs can be particularly appropriate in a context where the igniter is to be secured to the gas turbine engine by a threaded engagement concentric to the heater rod axis, which is typically the case when retrofitting the igniter to an existing spark plug aperture, because in such context, the axisymmetricity ensures that there is no need to achieve a specific angular orientation relative to the thread. However, there are other cases where the circumferential orientation of the igniter relative to the socket in the gas turbine engine can be known, such as via a specific engine design for instance, and in which a non-axisymmetric design can be preferred and better adapted to the specific features of the environment of use. For instance, an igniter can be designed for use in a specific orientation relative to the axis of the socket which receives it, and/or for a specific circumferential position (e.g. 3 O'clock, 6 O'clock) in the engine, in which specific elements of the environment, such as known position of incoming fuel mist, known position of heating air, known local orientation of gravity, etc. can be predetermined.

Embodiments disclosed herein include:

A. An igniter for a gas turbine engine comprising: a base, a glow plug heater rod, the glow plug heater rod extending from the base along an axis and terminating in a rod end, a sleeve extending circumferentially around the glow plug heater rod along at least a portion of a length of the glow plug heater rod, the sleeve having an inner surface spaced from the glow plug heater rod to provide a gap between the inner surface and the glow plug heater rod, the gap extending radially relative to said axis.

B. A gas turbine engine comprising: a casing; a combustor liner within the casing and spaced apart therefrom, the combustor liner delimiting a combustion chamber; and an igniter, the igniter having a base connected to the casing and a glow plug heater rod, the glow plug heater rod extending from the base along an axis and terminating in a rod end, a sleeve extending circumferentially around the glow plug heater rod along at least a portion of a length of the glow plug heater rod, the sleeve having an inner surface spaced from the heater rod to provide a gap between the inner surface and the heater, the gap extending radially relative to said axis.

C. A method of operating an igniter of a gas turbine engine, comprising: receiving a mixture of air and fuel to be ignited in a flow circulation area around a heating section of a glow plug heater rod; igniting the mixture of the air and the fuel with the heating section of the heater rod; and impeding fluid circulation of the ignited mixture of the air and the fuel from flowing towards the base, between a sleeve and the heater rod.

Embodiments A, B, and C may have any of the following elements in any combinations:

Element 1: the glow plug heater rod has a metal to ceramic junction between the base and the rod end, the sleeve extending circumferentially around the heater rod along at least a portion of the length extending between the metal to ceramic junction and the rod end. Element 2: the gap forms a constriction at a position located axially between the rod end and the base. Element 3: the heater rod has a heating section axially extending along the axis between axially opposite ends of a heater contained within the heater rod, at least a portion of the heating section axially protruding from the constriction. Element 4: the gap is fluidly connected to a fluid flow circulation area located around the rod end. Element 5: the gap defines a constricted area and an expanded area delimiting a fluid flow circulation area around the rod end, the constricted area being located axially between the rod end and the base, a cross-sectional area of the constricted area taken along a plane normal to the axis being less than that of the expanded area. Element 6: the sleeve is structurally connected to the base and protrudes along the axis from the base towards the rod end. Element 7: the sleeve has a portion connected to the heater rod between the rod end and the base. Element 9: the heater rod has a heating section axially extending along the axis between axially opposite ends of a heater contained within the heater rod, the sleeve extending circumferentially around the heater rod axially along at least the heater section of the heater rod. Element 10: the base includes a body of a glow plug, the glow plug including the heater rod and further including at least a casing portion of an adaptor, the casing portion of the adaptor connected to the body of the glow plug around the body of the glow plug. Element 11: the sleeve forms part of the casing portion of the adaptor. Element 12: the adaptor further comprises a liner portion configured to be matingly connected to a combustor liner of the gas turbine engine, the sleeve forming part of the liner portion. Element 13: a portion of an outer surface of the base is threaded for engaging a correspondingly threaded aperture of a casing of the gas turbine engine. Element 14: the base defines a shoulder, the shoulder defining an abutment surface that axially faces the rod end, the threaded portion of the base located axially between the shoulder and the rod end. Element 15: a sealing engagement is defined between the portion of the outer surface of the base being threaded and the correspondingly threaded aperture of the casing of the gas turbine engine. Element 16: the sleeve is connected to the base independently of a structure of the gas turbine engine and protrudes along the axis from the base towards the rod end. Element 17: the sleeve extends around a full circumference of the glow plug heater rod and axially relative to the axis from the casing to the combustion chamber liner. Element 18: the sleeve has a portion connected to the heater rod between the gap and the base.

Still other modifications which fall within the scope of the present invention will be apparent to those skilled in the art, in light of a review of this disclosure, and such modifications are intended to fall within the appended claims.

The invention claimed is:

1. A method of operating an igniter of a gas turbine engine, the igniter extending through an igniter aperture of a combustor liner enclosing a combustion chamber, a collar being secured to the combustor liner and extending from the combustor liner, the method comprising:
    receiving a mixture of air and fuel to be ignited in a flow circulation area around a heating section of a glow plug heater rod of the igniter, the glow plug heater rod extending along an axis and terminating in a rod end, the flow circulation area being annular, extending circumferentially around the glow plug heater rod and radially between the glow plug heater rod and a sleeve relative to the axis, and communicating with the combustion chamber, the sleeve having an inner surface continuously extending around the flow circulation area to block fluid communication between the flow circulation area and an environment outside the flow circulation area through the sleeve in a radial direction relative to the axis, the sleeve extending through the collar;
    preventing compressed air from flowing in the combustion chamber via the igniter aperture with a substantially cylindrical outer surface of the sleeve being in abutment against an inner surface of the collar;
    igniting the mixture of air and fuel with the heating section of the glow plug heater rod; and
    impeding fluid circulation of the ignited mixture of the air and the fuel from flowing between the sleeve and the glow plug heater rod towards a base of the igniter.

2. A gas turbine engine comprising:
    a casing;
    a combustor liner within the casing and spaced apart therefrom, the combustor liner delimiting a combustion chamber and defining an igniter aperture, the igniter aperture bounded by a peripheral face;
    a collar secured to the combustor liner and extending from the combustor liner;
    an igniter, the igniter having a base connected to the casing and a glow plug heater rod, the glow plug heater rod extending from the base along an axis and terminating in a rod end, a sleeve extending circumferentially around the glow plug heater rod along at least a portion of a length of the glow plug heater rod, the sleeve having an inner surface spaced from the glow plug heater rod to provide a gap between the inner surface and the glow plug heater rod, the gap being annular, extending radially and circumferentially relative to the axis, and being opened to the combustion chamber,
    wherein a substantially cylindrical outer surface of the sleeve is in abutment against an inner surface of the collar to limit a flow of compressed air from a compressor of the gas turbine engine from entering the combustion chamber.

3. The gas turbine engine of claim 2, wherein the sleeve is connected to the base and protrudes along the axis from the base towards the rod end.

4. The gas turbine engine of claim 2, wherein the sleeve and the gap extend around a full circumference of the glow plug heater rod and axially relative to the axis from the casing to the combustor liner.

5. The gas turbine engine of claim 2, wherein the sleeve has a portion connected to the glow plug heater rod between the gap and the base.

6. A gas turbine engine comprising:
    a casing;
    a combustor liner within the casing and spaced apart therefrom, the combustor liner delimiting a combustion chamber, the combustor liner defining an igniter aperture;
    a collar secured to the combustor liner and extending from the combustor liner, the collar extending about a whole circumference of the igniter aperture; and
    an igniter having a base connected to the casing, a glow plug heater rod, the glow plug heater rod extending from the base along an axis and terminating in a rod end, a sleeve extending circumferentially around a full circumference of the glow plug heater rod along at least a portion of a length of the glow plug heater rod, the sleeve extending through the collar and through the igniter aperture, a portion of an outer surface of the sleeve being in abutment against an inner surface of the collar to limit a flow of compressed air from a compressor of the gas turbine engine from entering the combustion chamber via the igniter aperture, the portion of the outer surface of the sleeve that is in abutment against the inner surface of the collar being substantially cylindrical, the sleeve having an inner surface spaced from the glow plug heater rod to provide a gap between the inner surface of the sleeve and the glow plug heater rod, the gap being annular and extending radially and circumferentially relative to the axis, the inner surface of the sleeve continuously extending around the gap to block fluid communication between the gap and an environment outside the gap through the sleeve in a radial direction relative to the axis, the gap fluidly communicating with the combustion chamber.

7. The gas turbine engine of claim 6, wherein the glow plug heater rod has a metal to ceramic junction between the base and the rod end, the sleeve extending circumferentially around the glow plug heater rod along at least a portion of a length extending between the metal to ceramic junction and the rod end.

8. The gas turbine engine of claim 6, wherein the gap forms a constriction at a position located axially between the rod end and the base.

9. The gas turbine engine of claim 8, wherein the glow plug heater rod has a heating section axially extending along the axis between axially opposite ends of a heater contained within the glow plug heater rod, at least a portion of the heating section axially protruding from the constriction.

10. The gas turbine engine of claim 6, wherein the gap is fluidly connected to a fluid flow circulation area located around the rod end.

11. The gas turbine engine of claim 6, wherein the gap defines a constricted area and an expanded area delimiting a fluid flow circulation area around the rod end, the constricted area being located axially between the rod end and the base, a cross-sectional area of the constricted area taken along a plane normal to the axis being less than that of the expanded area.

12. The gas turbine engine of claim 6, wherein the sleeve is structurally connected to the base and protrudes along the axis from the base towards the rod end.

13. The gas turbine engine of claim 6, wherein the sleeve has a portion connected to the glow plug heater rod between the rod end and the base.

14. The gas turbine engine of claim 6, wherein the glow plug heater rod has a heating section axially extending along the axis between axially opposite ends of a heater contained within the glow plug heater rod, the sleeve extending circumferentially around the glow plug heater rod axially along at least the heater section of the glow plug heater rod.

15. The gas turbine engine of claim 6, wherein the base includes a body of a glow plug, the glow plug including the glow plug heater rod and further including at least a casing portion of an adaptor, the casing portion of the adaptor connected to the body of the glow plug around the body of the glow plug.

16. The gas turbine engine of claim 15, wherein the sleeve forms part of the casing portion of the adaptor.

17. The gas turbine engine of claim 15, wherein the adaptor further comprises a liner portion configured to be matingly connected to a combustor liner of the gas turbine engine, the sleeve forming part of the liner portion.

18. The gas turbine engine of claim 6, wherein a portion of an outer surface of the base is threaded for engaging a correspondingly threaded aperture of a casing of the gas turbine engine.

19. The gas turbine engine of claim 18, wherein the base defines a shoulder, the shoulder defining an abutment surface that axially faces the rod end, the threaded portion of the base located axially between the shoulder and the rod end.

20. The gas turbine engine of claim 18, wherein the threaded portion of the outer surface of the base is configured to define a sealing engagement with the correspondingly threaded aperture of the casing of the gas turbine engine.

\* \* \* \* \*